(12) United States Patent
Granville

(10) Patent No.: US 8,775,257 B2
(45) Date of Patent: Jul. 8, 2014

(54) PRESERVATION OF SCORES OF THE QUALITY OF TRAFFIC TO NETWORK SITES ACROSS CLIENTS AND OVER TIME

(75) Inventor: Vincent Granville, Issaquah, WA (US)

(73) Assignee: Elan Branch, LLC, Skokie, IL (US)

(*) Notice: Subject to any disclaimer, the term of this patent is extended or adjusted under 35 U.S.C. 154(b) by 452 days.

(21) Appl. No.: 12/991,293

(22) PCT Filed: May 5, 2009

(86) PCT No.: PCT/US2009/042883
§ 371 (c)(1),
(2), (4) Date: Feb. 21, 2011

(87) PCT Pub. No.: WO2009/137507
PCT Pub. Date: Nov. 12, 2009

(65) Prior Publication Data
US 2011/0161492 A1 Jun. 30, 2011

Related U.S. Application Data

(60) Provisional application No. 61/050,565, filed on May 5, 2008.

(51) Int. Cl.
*G06Q 30/00* (2012.01)
*G06F 15/173* (2006.01)

(52) U.S. Cl.
USPC ............. 705/14.69; 705/14.71; 790/224

(58) Field of Classification Search
USPC ............. 709/224; 705/7.39, 35, 14.69, 14.47, 705/14.71
See application file for complete search history.

(56) References Cited

U.S. PATENT DOCUMENTS

| | | | |
|---|---|---|---|
| 7,031,932 B1* | 4/2006 | Lipsky et al. | 705/14.41 |
| 2007/0129999 A1 | 6/2007 | Zhou et al. | |
| 2007/0255821 A1 | 11/2007 | Ge et al. | |
| 2008/0059301 A1 | 3/2008 | Granville | |

FOREIGN PATENT DOCUMENTS

JP 2002-245339 A 8/2002

OTHER PUBLICATIONS

International Search Report issued in PCT/US2009/042883, mailed on Dec. 28, 2009, 2 pages.
Written Opinion in PCT/US2009/042883, mailed on Dec. 28, 2009, 4 pages.
PCT Notification Concerning Transmittal of International Preliminary Report on Patentability (Chapter 1 of PCT) (6 pages) mailed Nov. 18, 2010 for related PCT/US2009/042883.

* cited by examiner

*Primary Examiner* — Sun Li
(74) *Attorney, Agent, or Firm* — Osha • Liang LLP; John W. Montgomery

(57) ABSTRACT

A method and system for preserving scores of the quality of traffic to network sites, so that the scores are consistent over time and/or are comparable across clients.

2 Claims, 12 Drawing Sheets

| day (305) | old scoring - average score (310) | old scoring - standard deviation (315) | new scoring - average score (320) | new scoring - standard deviation (325) | new scoring preserving old score - average score (330) | new scoring preserving old score - standard deviation (335) | 2-week avg (340) | 2-week avg (345) | 4-week avg (350) | 4-week avg (355) |
|---|---|---|---|---|---|---|---|---|---|---|
| 1 | 654 | 43 | | | | | | | | |
| 2 | 643 | 42 | | | | | | | | |
| 3 | 651 | 45 | | | | | | | | |
| 4 | 650 | 40 | | | | | | | | |
| 5 | 649 | 38 | | | | | | | | |
| 6 | 662 | 41 | | | | | | | | |
| 7 | 663 | 40 | | | | | | | | |
| 8 | 629 | 39 | | | | | | | | |
| 9 | 655 | 34 | | | | | | | | |
| 10 | 654 | 45 | | | | | | | | |
| 11 | 643 | 34 | | | | | | | | |
| 12 | 645 | 39 | | | | | | | | |
| 13 | 644 | 35 | | | | | | | | |
| 14 | 654 | 33 | | | | | | | | |
| 15 | 639 | 31 | 480 | 22 | | | | | | |
| 16 | 643 | 35 | 477 | 23 | | | | | | |
| 17 | 630 | 39 | 450 | 21 | | | | | | |
| 18 | 606 | 30 | 469 | 19 | | | | | | |
| 19 | 599 | 28 | 444 | 20 | | | | | | |
| 20 | 639 | 34 | 451 | 22 | | | | | | |
| 21 | 645 | 32 | 467 | 23 | | | mu' 631 | sigma' 36 | | |
| 22 | 650 | 41 | 487 | 24 | | | | | | |
| 23 | 615 | 38 | 452 | 20 | | | | | | |
| 24 | 623 | 45 | 459 | 22 | | | | | | |
| 25 | 630 | 40 | 465 | 21 | | | mu 466 | sigma 22 | | |
| 26 | 634 | 41 | 469 | 19 | | | | | | |
| 27 | 640 | 34 | 478 | 24 | | | | | | |
| 28 | 635 | 39 | 480 | 26 | | | | | 640 | 38 |
| 29 | 608 | 30 | 453 | 19 | 609 | 31 | | | 360 | 365 |
| 30 | 645 | 36 | 473 | 23 | 642 | 38 | | | | |
| 31 | 640 | 34 | 465 | 21 | 628 | 35 | | | | |
| 32 | 598 | 29 | 440 | 18 | 587 | 30 | | | | |

| | | desired user action occurred | | desired user action did not occur | | correlation between rule and desired user action | rule flag |
|---|---|---|---|---|---|---|---|
| | | rule value | | rule value | | | |
| rule | | 0 | 1 | 0 | 1 | | |
| | rule₁ | 2,000 | 6,500 | 500 | 1,000 | | |
| | rule₂ | | | | | | |
| | rule₃ | | | | | | |
| | rule₄ | | | | | | |
| | rule₅ | | | | | | |
| | ... | | | | | | |
| | ruleₙ | | | | | | |

|  | rule 1 | rule 2 | ... | rule n-3 | rule n-2 | rule n-1 | rule n | # fraudulent transactions | # non-fraudulent transactions | total # transactions | fraud odds ratio |
|---|---|---|---|---|---|---|---|---|---|---|---|
| result 1 | 0 | 0 |  | 0 | 0 | 0 | 0 |  |  |  |  |
| result 2 | 0 | 0 |  | 0 | 0 | 0 | 1 |  |  |  |  |
| result 3 | 0 | 0 |  | 0 | 0 | 1 | 0 |  |  |  |  |
| result 4 | 0 | 0 |  | 0 | 0 | 1 | 1 |  |  |  |  |
| result 5 | 0 | 0 |  | 0 | 1 | 0 | 0 |  |  |  |  |
| ... |  |  |  |  |  |  |  |  |  |  |  |
| result m | 1 | 1 |  | 1 | 1 | 1 | 1 |  |  |  |  |

*FIG. 11*

PRESERVATION OF SCORES OF THE QUALITY OF TRAFFIC TO NETWORK SITES ACROSS CLIENTS AND OVER TIME

TECHNICAL FIELD

The disclosed technology relates to assessing the value of traffic associated with network sites.

BACKGROUND

An increasing number of companies, agencies, individuals, and other parties (collectively "advertisers") use online advertising to advertise to users of Internet or other network sites or services. An advertiser purchases advertising space from an individual publisher or from an advertising network that distributes advertisements to one or more publishers. A publisher or advertising network may charge the advertiser using one of several methods, including cost-per-click and cost-per-impression. In a cost-per-click system, an advertiser is charged based on the number of times that agents click on its advertisement. An advertiser is not charged when a publisher displays an advertisement to an agent unless the agent clicks on the advertisement. In a cost-per-impression system, an advertiser is charged based on the number of times a publisher displays its advertisement to an agent.

Click fraud, or fraudulent clicks on advertisements, is an issue that concerns advertisers and publishers who use cost-per-click and other payment models. Similarly, impression fraud, or displays of advertisements in situations where the advertisements will not make an impression on a human user, is an issue that concerns advertisers and publishers who use cost-per-impression and other payment models. Click or impression fraud can take a number of forms, including clicks on an advertisement by or displays of an advertisement to competitors, web robots, or users with personal or political agendas. In addition, an adware or clickware virus may install itself on a computer and generate clicks on or impressions of advertisements without the computer user's knowledge. Fraudulent clicks or impressions do not generate revenue or other value for an advertiser; however, the advertiser must pay for the clicks or impressions. Click or impression fraud therefore harms the advertiser by increasing advertising expense, and at the same time harms the publisher by lowering the perceived value of traffic the advertiser receives from the publisher. The need therefore exists for a system that overcomes the above limitations, in addition to providing other benefits.

BRIEF DESCRIPTION OF THE DRAWINGS

FIG. 3 is a table of example data that illustrates how scores may be preserved over time for a given client according to one or more embodiments.

FIG. 7 is a block diagram of a data structure used to compute the correlation between each rule in the rule set used to assess the quality of traffic to a network site and a desired agent action.

FIG. 11 is a block diagram of a data structure used to identify correlated parameters that characterize traffic associated with network sites, the data structure depicted prior to processing data characterizing the traffic.

DETAILED DESCRIPTION

Figure 1:
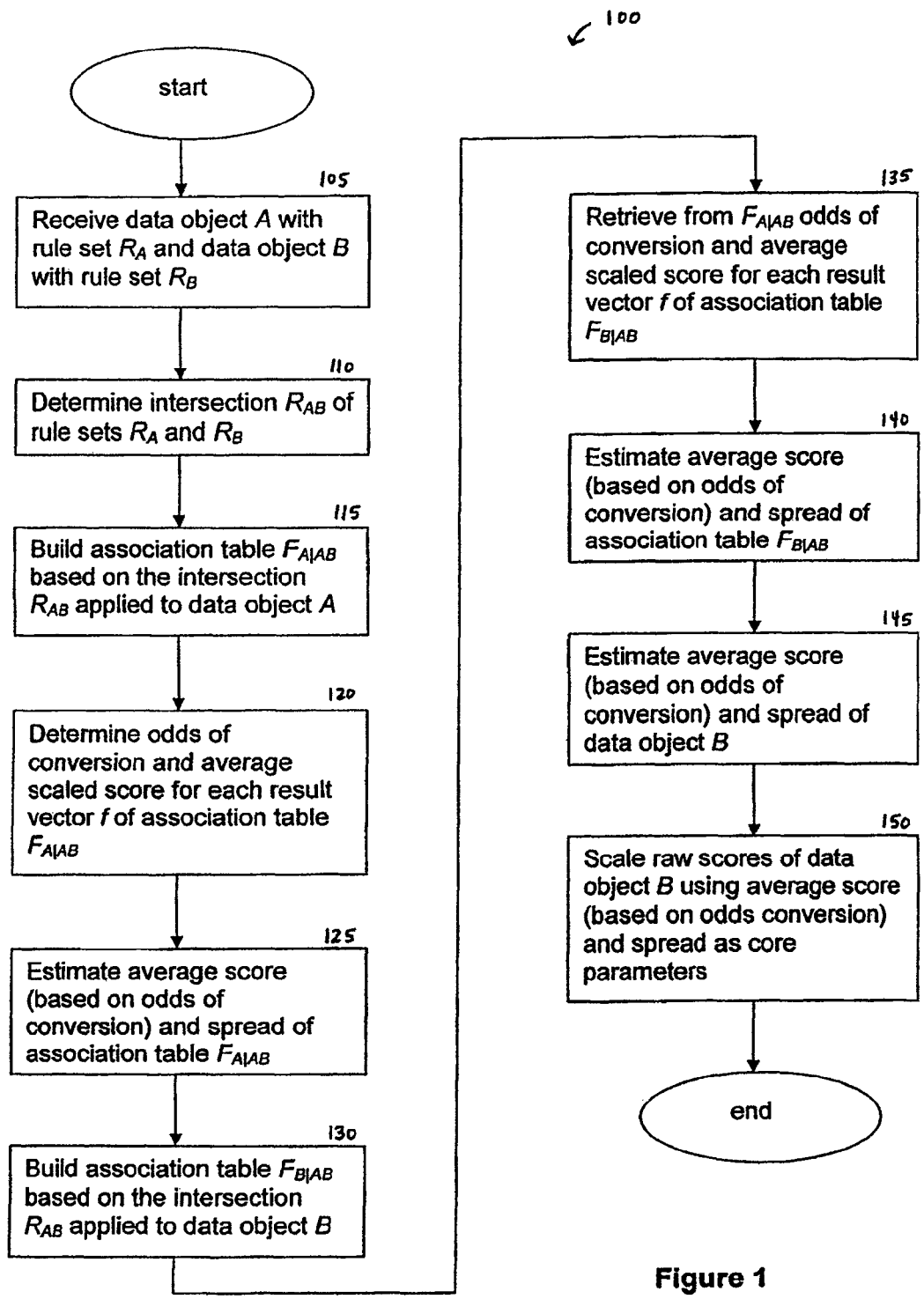
FIG. 1 is a block flow diagram of a process that may be used to preserve scores of the quality of traffic to network sites according to one or more embodiments.

In order to improve the quality of the traffic that is sent to or received by a network site, a method and/or system for scoring the quality of traffic to network sites may be used. The quality of traffic for a network site may be determined based on a variety of factors, including the amount of click or impression fraud, whether valuable actions (e.g., purchases) are generated, characteristics of the advertiser and/or publisher, and other factors. For example, a method and system for generating non-binary scores of traffic to network sites is described in commonly owned PCT Patent Application Serial No. US07/64454, entitled Scoring Quality of Traffic to Network Sites Using Interrelated Traffic Parameters, filed Mar. 20, 2007, the substance of which is included herein as Appendix A, below.

The method and/or system for scoring the quality of traffic to network sites, such as that described in Appendix A, may extract session data, or information identifying an agent's interactions with a server, from one or more server logs or other data sources obtained from a publisher, advertiser, or third party. In addition, supplemental data may be obtained from external data sources to assist in interpreting the agent's interactions with the server. A session may be defined as one or more entries in the server log or other data source indicative of an agent's interaction with a network site.

The method and/or system may apply a multi-factor analysis, in the form of a rule set, to the session data. Each rule in the rule set is an expression that receives as input one or more parameters associated with an agent's session. When the rule is applied to the input parameters, it produces a result that reflects the value of an agent's actions associated with that agent's session. Within each rule set, each rule may be weighted differently, such as based on how accurately it predicts desirable agent actions, in order to generate an optimum combination of rules.

A result vector is a combination of all rule results for a particular session. The method and system may generate an association table, which has a plurality of rows, each row representing a unique result vector (i.e., combination of rule results). The result vector for each session is mapped to the association table, and additional information, such as whether a transaction associated with the session was fraudulent or non-fraudulent, is recorded.

The analysis of the session data identifies agent actions that are desirable to a publisher, advertiser, or third party. Agent actions that are desirable to a publisher, advertiser, or third party include any activity that generates value for the publisher, advertiser, or third party, such as a click, a conversion (e.g., purchase), a submission of a form, bookmarking of the site, a rollover event, an impression, or other activity by the user. The odds of conversion may be defined as the probability that an agent interaction with a network site will result in a desirable agent action.

The method and system generates a relative, raw score for each agent action or for an aggregate number of agent actions based on whether the agent action is desired by the publisher, advertiser, or third party. The raw score may be scaled to place it in a form that may be more readily understood and used by advertisers and publishers. For example, a score may be scaled to fall within a standard range, such as a range from 300 to 800. The score may be used to assess the quality of the traffic received by a network site. A lower score is indicative of fraudulent, likely fraudulent, or otherwise non-productive traffic having little value, whereas a higher score is indicative of traffic having desirable characteristics and therefore greater value. Further discussion of each of these concepts may be found in Appendix A.

Score Preservation

A method and system for preserving scores of the quality of traffic to network sites, so that the scores are consistent over time according to one or more embodiments and are comparable across clients according to one or more embodiments, is described. A score may be generated for a client (i.e., a party interested in receiving traffic scores) a single time, or a score may be generated for a client many times over a given time period. For example, a score may be generated for a client on a periodic basis (e.g., once a week, once a month, four times a year), at the client's request, or when there are changes in data used to assess the quality of traffic. In addition, scores may be generated for multiple clients, whether members of the same or different populations (e.g., industry segments). When multiple scores are generated for a single client or across many clients, it is desirable to preserve the consistency of the scores. Preserving the consistency of scores allows a single client to compare performance over time, regardless of changes to the volume of traffic or changes to the methodology used to analyze the traffic. Preserving the consistency of scores also allows multiple clients to compare performance, even if the clients are in different industries to attract different types of traffic.

Once a score has been generated to measure the quality of traffic to a network site, such as in the manner described in Appendix A, it is desirable to preserve the consistency of the score over time. Preserving the consistency of a score means that if the quality of traffic associated with a client's site is approximately the same during each scoring period, the score generated for each scoring period should also be approximately the same. Without a score preservation technique, scores for different scoring periods may vary dramatically, even if the quality of traffic associated with the site remains the same. For example, scores may vary for different scoring periods when different rules are applied to the traffic, when different traffic data is provided to the scoring system, when the methodology of the scoring system is improved, and/or in other circumstances. Preserving the consistency of a score also means that if the quality of traffic associated with a client's site increases or decreases from one scoring period to the next, the score preservation technique should properly reflect the increase or decrease in traffic quality over time. That is, a decrease in a client's score should indicate that traffic quality has decreased, not simply that new rules have been discovered to better detect click fraud. Among other benefits, preserving the consistency of scores over time facilitates an accurate representation of trends in traffic quality for a given client.

In addition, it is desirable to maintain the consistency of scores across various clients to allow the quality of traffic to be compared across clients. For example, a similar score for two clients should indicate that the quality of traffic associated with the clients' sites is similar. In contrast, a lower score for a first client as compared to a second client should indicate a lower quality of traffic for the first client than for the second. Without a score preservation technique, scores generated for various clients may differ significantly, even if the quality of traffic is similar. For example, each client may provide different traffic data to the scoring system, different rule sets may be applied to each client (i.e., based on industry segment), different rules may be triggered by each client, and other distinguishing factors may apply. Preserving the consistency of scores across clients allows scores to be compared among diverse clients. Scores may be compared across all clients as a whole, or scores may be compared across clients in a given population. For example, clients may be separated into different populations according to factors such as industry segment, site environment, type of traffic, and/or other factors.

The method and system for score preservation described herein may be used for a variety of benefits, including updating scores for a given client (such as during a scheduled periodic update, after adding new rules, and/or after receiving modified data fields from the client), producing scores that are comparable among clients, and using a reference data set to scale scores for a new client (e.g., a search engine) that does not have access to conversion data. Other benefits of the method and system will be apparent to one skilled in the art.

Concept

The method and system for preserving scores of the quality of traffic to network sites preserves core parameters in order to maintain score distribution. Core parameters are standard measures of an average score (such as a mean or median) and a variance in score (such as a spread or standard deviation). The methodology is herein illustrated using the following core parameters: $odds_1$-score (denoted as u), which is an average score of the traffic based on the odds of conversion, and spread (denoted as v), which is the amount by which traffic scores are spread out, or dispersed. In other embodiments, the methodology may use other core parameters such as the mean (denoted as $\mu$) and standard deviation (denoted as $\sigma$) of an average score. The methodology is similar in different embodiments, except that raw scores are scaled according to different algorithms in order to produce scaled scores.

Consider two data objects A and B from two different sources. For example, data object A may comprise combined advertiser data, while data object B may comprise search engine data. As another example, both data objects may be from the same client, but from two different time periods; that is, data object A may comprise September/October data associated with an advertiser, and data object B may comprise October/December data associated with the same advertiser.

In some embodiments, data object A comprises the following:

A rule set $R_A$ and rule weights used to generate result vectors.

An association table $F_A$ of result vectors.

Known or estimated odds of conversion for each result vector.

Scaled score for each result vector.

Parameters $u_A$ and $u_B$, either known or estimated, such as using equations (1) and (2) below.

In some embodiments, data object B comprises the following:

A rule set $R_B$ overlapping with $R_A$ and rule weights used to generate result vectors.

An association table $F_B$ of result vectors.

Raw (un-scaled) score for each result vector.

Estimation of Core Parameters

In some embodiments, core parameters u and v are set according to default values (e.g., u=650 and v=50). In other embodiments, core parameters u and v may be estimated according to equations (1) and (2):

$$\hat{u} = \frac{\Sigma_+ n_f S_f}{\Sigma_+ n_f} \cdot \left\{ 1 - \frac{\Sigma_+ n_f L_f S_f \cdot \Sigma_+ n_f L_f}{\Sigma_+ n_f L_f^2 \cdot \Sigma_+ n_f S_f} \right\} \cdot \left\{ 1 - \frac{\Sigma_+ n_f L_f}{\Sigma_+ n_f L_f^2 \cdot \Sigma_+ n_f} \right\}^{-1} \quad (1)$$

$$\hat{v} = \frac{\Sigma_+ n_f (S_f - \hat{u})}{\Sigma_+ n_f L_f} \cdot \ln 2 \quad (2)$$

where f is a result vector, $n_f$ is a number of clicks per result vector, $S_f$ is a scaled score for the result vector, and $L_f$ is the logarithm of an odds of conversion $Q_f$ for the result vector. In addition, $\Sigma_+$ is equivalent to $$\sum_{f \in \Omega^+},$$

where $\Omega$ is the set of all result vectors, and $\Omega^+$ is the subset of all result vectors simultaneously satisfying $v_f > 0$ and $v_f < 1$. If necessary, smaller result vectors with a similar score may be grouped together to reduce or eliminate the gap between $\Omega$ and $\Omega^+$.

Equations (1) and (2) are derived from the system:

$$Q_f = 2^{(S_f - u)/v}, \text{ for } f \in \Omega^+$$

This is a system with many equations (one for each $f \in \Omega^+$, unless the result vectors have been grouped into several bins) and only two unknowns. It can be solved as a weighted regression problem, where the weight for each f is $n_f$. Taking the neperian logarithm on each side, and using the notation $L_f = \log Q_f$, the system becomes:

$$v \cdot L_f = (S_f - u) \cdot \ln 2, \text{ for } f \in \Omega^+$$

By construction, $Q_f > 0$ if $f \in \Omega^+$, and thus the logarithm $L_f$ is always defined. The solution is given by equations (1) and (2) above.

Estimated Odds of Conversion

In some embodiments, the odds of conversion $Q_f$ may be determined according to equation (3):

$$Q_f = \frac{v_f}{n_f - v_f} \cdot \left\{ \frac{\Sigma v_g}{\Sigma (n_g - v_g)} \right\} \quad (3)$$

where each summation is computed over all result vectors g using historical data (such as data accumulated over a few weeks), summarized at the result vector level. Odds of conversion $Q_f = 1$ corresponds to an average result vector.

Scaled Score

In some embodiments, the scaled score $S_f$ may be determined according to equation (4):

$$S_f = u + v \cdot \frac{\ln Q_f}{\ln 2} \quad (4)$$

Note that when the odds of conversion are neutral (i.e., $Q_f = 1$), then $S_f = u$. When the odds of conversion are reduced by a factor of 2, the scaled score $S_f$ decreases by v points.

Methodology

FIG. 1 is a flow diagram of a process 100 that may be used to preserve scores of the quality of traffic to network sites. At a block 105, data object A and data object B (as described above) are received. As described above, data object A includes rule set $R_A$ and data object B includes rule set $R_B$. Once the data objects have been received, at a block 110, the methodology determines the intersection $R_{AB}$ of the two rule sets $R_A$ and $R_B$. That is, the subset of rules that apply to both data object A and data object B is determined. The intersection is represented by equation (5):

$$R_{AB} = R_A \cap R_B \quad (5)$$

Typical rules included in the intersection $R_{AB}$ may include geographic rules, various substrings found in a user agent, time parameters (such as day of the week), blacklisted IP addresses, distribution partner rules (if available in both A and B), query-based rules (such as length of keyword, number of terms, keyword category, keyword blacklist), properties attached to the IP address or IP range (such as white list, anonymous proxy, known robot, AOL, corporate proxy, suspicious domain name), combinations of these rules, and other rules and rule combinations.

Once the intersection $R_{AB}$ of the two rule sets is determined, in some embodiments, the methodology is performed as follows:

1. At a block 115, build an association table $F_{A|AB}$ based on the intersection $R_{AB}$ applied to data object A.
2. At a block 120, determine the odds of conversion and an average scaled score for each result vector $f \in F_{A|AB}$, using weighted averages on result vectors in $F_A$. In some embodiments, weight is based on the number of clicks or transactions.
3. At a block 125, estimate $\hat{u}_{A|AB}$ and $\hat{v}_{A|AB}$ using equations (1) and (2) (above) applied to $F_{A|AB}$.
4. At a block 130, build an association table $F_{B|AB}$ based on the intersection $R_{AB}$ applied to data object B.
5. At a block 135, retrieve odds of conversion and average scaled score for each result vector $f \in F_{B|AB}$, from $F_{A|AB}$. Use the fact that each $f \in F_{B|AB}$ has an equivalent $f' \in F_{A|AB}$ with known odds of conversion and average scaled score, by construction. Note that $f \in F_{B|AB}$ is equivalent to $f' \in F_{A|AB}$ if an only if the result vectors are associated with the same rule configuration from $R_{AB}$.
6. At a block 140, estimate $\hat{u}_{B|AB}$ and $\hat{v}_{B|AB}$ using equations (1) and (2) (above) applied to $F_{B|AB}$. Note that, in general, $n_f \neq n_{f'}$, even when $f \in F_{B|AB}$ is equivalent to $f' \in F_{A|AB}$. This ensures that $(\hat{u}_{A|AB}, \hat{v}_{A|AB})$ and $(\hat{u}_{B|AB}, \hat{v}_{B|AB})$ are usually different, unless A=B.

7. At a block 145, estimate the core parameters $\hat{u}_B$ and $\hat{v}_B$ associated with data object B using equations (6) and (7):

$$\hat{u}_B = \hat{u}_A \cdot \frac{\hat{u}_{B|AB}}{\hat{u}_{A|AB}} \quad (6)$$

$$\hat{v}_B = \hat{v}_A \cdot \frac{\hat{v}_{B|AB}}{\hat{v}_{A|AB}} \quad (7)$$

8. At a block 150, scale the raw scores available in data object B, using $\hat{u}_B$ and $\hat{v}_B$ as core parameters.

In general, the scores are scaled by applying a subset of rules to each of the datasets, determining a correction factor based on the application of the subset of rules, and then applying the correction factor to the raw scores.

Other Considerations

If the weights associated with the result vectors from data objects A and B are distributed quite differently, then $\hat{u}_B$, $\hat{v}_B$ will be quite different from $\hat{u}_A$, $\hat{v}_A$. For example, if data object B contains data that is of lower quality than a reference data set A, $\hat{u}_B$ should be less than $\hat{u}_A$.

Note that if most of the fraud in data object B does not show up in the smaller common rule subset $R_{AB}$ (but instead, in more ad hoc rules outside $R_A$), then $\hat{u}_B$ will be overestimated. However, in most instances, low quality that is detected in more advanced rules usually impacts a small percentage of transactions, and the low quality generally "transpires" to some extent in the smaller rule set $R_{AB}$, particularly if the smaller rule set is carefully built.

Simplified Procedure when Data Objects A and B are from the Same Client—Re-Scaling Schedule In some embodiments, a score is generated for a given client multiple times over a given time period. For example, periodic updates of a score may be performed on a scheduled basis, when a rule set is modified, and/or in other circumstances. The methodology in these embodiments is simpler, in the sense that it can be done without explicitly identifying a common rule set $R_{AB}$, particularly if the data has not changed significantly.

To preserve the consistency of scores for a given client over time, the methodology maintains the same average score and variance between scoring periods. For example, a score may be generated for a given client during a first scoring period. For each subsequent scoring period, the score is rescaled so that it is consistent with the average score and the variance of the first scoring period.

When the methodology is used to preserve the consistency of scores for a client over time (e.g., update a client's score), in some embodiments, the methodology may use an overlapping time period to further increase score accuracy. For example, scoring periods may have a minimum number of days (e.g., seven) in common.

Figure 2:
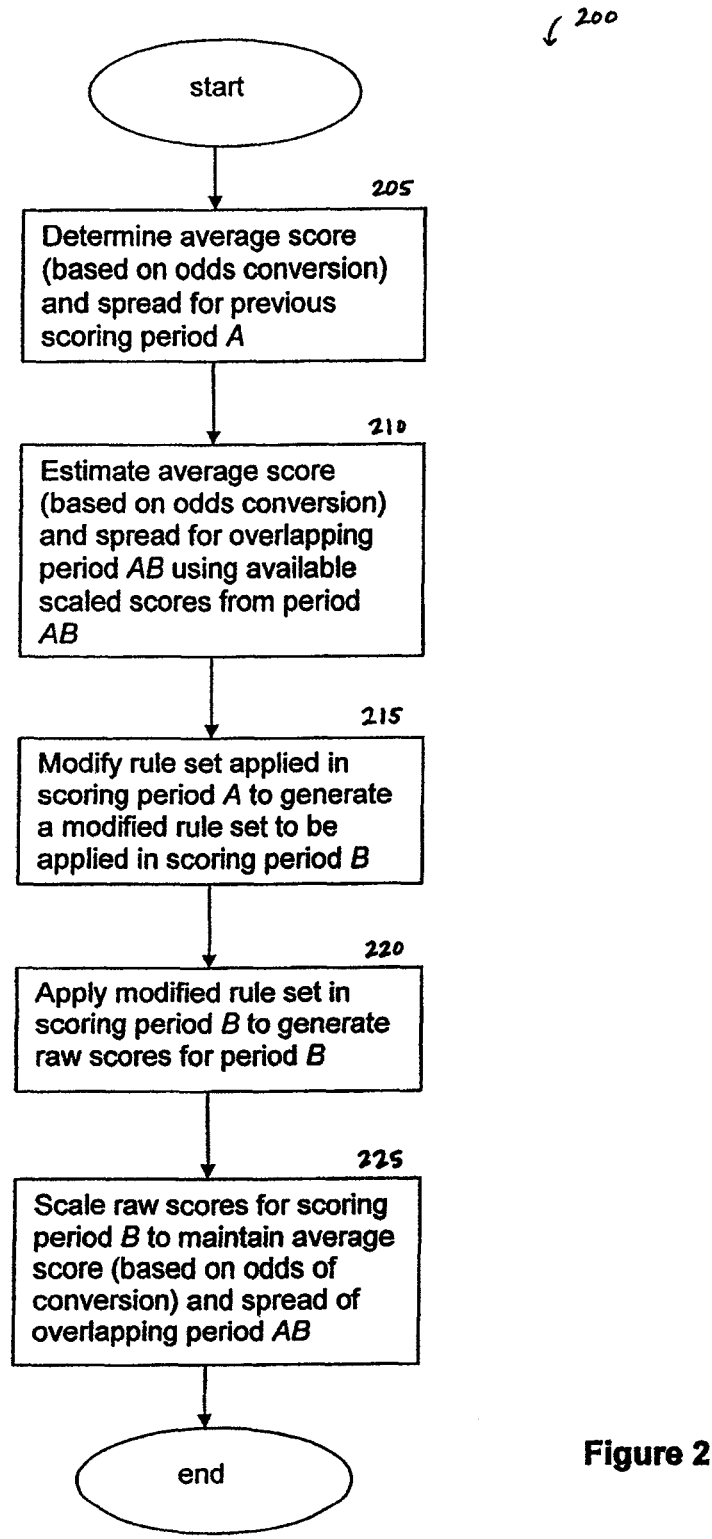
FIG. 2 is a block flow diagram of a process that may be used to preserve scores of the quality of traffic when performing updates for the same client according to one or more embodiments.

FIG. 2 is a flow diagram of a process 200 that may be used to preserve scores of the quality of traffic when performing updates for the same client:

1. At a block 205, determine $u_A$ and $v_A$, the parameters obtained during the last rescaling that occurred (period A), such as eight weeks ago.
2. At a block 210, estimate $u_{A|AB}$ and $v_{A|AB}$ using available scaled scores on weeks −1 and −2. This time period is referred to as the AB period.
3. At a block 215, modify the rule set (such as by computing new weights for each rule, as part of a rule updating schedule).
4. Set $u_{A|AB} = u_{A|AB}$ and $v_{B|AB} = v_{A|AB}$, so that these parameters are the same for period A and period B.
5. Moving forward, at a block 220, apply the modified rule set in period B (week −2, −1, +0, +1, etc.) to generate raw scores for period B.
6. At a block 225, scale the raw scores for period B by using the scaling formula applied to the raw scores with $u_B = u_{B|AB}$ and $v_B = v_{B|AB}$.

In those embodiments in which the data set changes but does not have backward compatibility, it may not be feasible to use an overlapping window (such as week −1, −2). Instead, consecutive weeks may be used.

FIG. 3 illustrates how scores may be preserved over time for a given client in some embodiments. Column 305 lists the days on which a score is generated for the client. Column 310 lists the average score generated for the client on each day according to a previous scoring methodology (referred to in FIG. 3 as "old scoring"). Column 315 lists the standard deviation associated with the scores of column 310. In the example illustrated by FIG. 3, the previous scoring methodology is applied to days 1 through 28 (note that the previous scoring methodology is also applied to days 29-32 for illustration purposes). On day 29, a new scoring methodology is applied, e.g., new rules may be added to the rule set. Column 320 lists the average score generated for the client according to the new scoring methodology (referred to in FIG. 3 as "new scoring"). Column 325 lists the standard deviation associated with the scores of 320.

As described above, scores may vary significantly for a given client when the scoring methodology changes, even if the quality of traffic received by the client remains the same. As illustrated by FIG. 3, on day 28, the client has an average score of 635 and a corresponding standard deviation of 39. On day 29, if the previous scoring methodology continues to be applied, the client will have an average score of 608 and a standard deviation of 30. However, when the new scoring methodology is applied on day 29, the client's average score is 453 with a corresponding standard deviation of 19. To generate data that is used to scale the new scores, new scores may be computed backward over a previous time frame. FIG. 3 illustrates scores computed backward according to the new methodology for the previous 14 days, i.e., days 15 through 28.

The overlapping time period in which both old and new scores have been generated—here, days 15 through 28—is used to calibrate the new scores going forward. That is, a linear transformation to be applied to the new scores is determined according to the formulas described above, using the old average score 631 and standard deviation 36 (blocks 340 and 345) in the overlapping time period, and the new average score 466 and standard deviation 22 (blocks 350 and 355) in the overlapping time period. Column 330 contains the newly calibrated scores. For example, on day 29, when the new scoring methodology is combined with the linear transformation, the client has an average score of 609 and a corresponding standard deviation of 31. In addition, other data may be generated for analysis, including the average score 640 and standard deviation 38 (blocks 360 and 365) for a given time period—here, four weeks.

Scaling Raw Scores when Odds of Conversion are not Available

In some embodiments, odds of conversion are not available. For example, a search engine does not generally have access to data that indicates whether a desirable agent action was ultimately generated at an advertiser's site. In such embodiments, assume an association table with no conversion metrics and a raw score $S^*_f$ for each result vector f. Estimated values $\hat{Q}_f$ will be obtained for the odds of conversion.

The methodology relies on the fact that a good, standard estimator of the odds of conversion, for a given result vector f, is provided by the two-parameter equation (8):

$$\hat{Q}_f = \exp(\alpha + \beta S^*_f) \quad (8)$$

Next, $\alpha$ and $\beta$ are estimated using two data points. For example, the 50th and 25th percentiles of the raw score distribution, denoted $S^*_{50}$ and $S^*_{25}$, may be used as data points.

Since no conversion is available, in some embodiments, educated guesses may be made regarding the odds of conversion $Q_{50}$ and $Q_{25}$ at $S^*_{50}$ and $S^*_{25}$, respectively. In other embodiments, $Q_{50}$ and $Q_{25}$ may be obtained using external data.

In general, good educated guesses may be $Q_{50}=1.00$ and $Q_{25}=0.50$, assuming raw scores are sorted by quality, in decreasing order. That is, $Q_{25}$ corresponds to relatively fraudulent clicks (25th percentile) converting at a rate of about 0.50×average.

Let $L_{50}=\ln Q_{50}$ and $L_{25}=\ln Q_{25}$. Then $\alpha$ and $\beta$ may be determined by solving the system:

$$\begin{cases} L_{50} = \alpha + \beta S^*_{50} \\ L_{25} = \alpha + \beta S^*_{25} \end{cases}$$

which provides the solution:

$$\begin{cases} \alpha = (S^*_{50} L_{25} - S^*_{25} L_{50})/(S^*_{50} - S^*_{25}) \\ \beta = (L_{50} - L_{25})/(S^*_{50} - S^*_{25}) \end{cases}$$

Note that if $S^*_{50}=S^*_{25}$, then the solution will not work. Instead, different data points may be used, such as the 75th and 25th percentiles, instead of the 50th and 25th percentiles. However, it should be noted that $S^*_{50}=S^*_{25}$ would indicate that the raw score distribution is very poor.

In other embodiments, a solution may consist of using more than two data points and performing a regression on $\alpha$ and $\beta$. In other embodiments, a model with three parameters, $\alpha$, $\beta$, and $\gamma$ may be used.

If core parameters are not available, a reference set may be used with the standard methodology described above. That is, the methodology may be used to determine u and v, substituting the odds of conversion (at the result vector level) with estimated odds of conversion. The raw scores may be scaled, such as according to equation (4) (above).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the methods and system provided herein can be applied to other systems, not necessarily the system described above. The elements and operation of the various embodiments described above can be combined to provide further embodiments.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

APPENDIX A

Appendix—Scoring Quality of Traffic to Network Sites Using Interrelated Traffic Parameters Appendix—Technical Field for Scoring Quality of Traffic to Network Sites Using Interrelated Traffic Parameters The disclosed technology relates to assessing the value of traffic associated with network sites.

APPENDIX BACKGROUND FOR SCORING QUALITY OF TRAFFIC TO NETWORK SITES USING INTERRELATED TRAFFIC PARAMETERS

An increasing number of companies, agencies, individuals, and other parties (collectively "advertisers") use online advertising to advertise to users of Internet or other network sites or services. An advertiser purchases advertising space from an individual publisher or from an advertising network that distributes advertisements to one or more publishers. A publisher or advertising network may charge the advertiser using one of several methods, including cost-per-click and cost-per-impression. In a cost-per-click system, an advertiser is charged based on the number of times that agents click on its advertisement. An advertiser is not charged when a publisher displays an advertisement to an agent unless the agent clicks on the advertisement. In a cost-per-impression system, an advertiser is charged based on the number of times a publisher displays its advertisement to an agent.

Click fraud, or fraudulent clicks on advertisements, is an issue that concerns advertisers and publishers who use cost-per-click and other payment models. Similarly, impression fraud, or displays of advertisements in situations where the advertisements will not make an impression on a human user, is an issue that concerns advertisers and publishers who use cost-per-impression and other payment models. Click or impression fraud can take a number of forms, including clicks on an advertisement by or displays of an advertisement to competitors, web robots, or users with personal or political agendas. In addition, an adware or clickware virus may install itself on a computer and generate clicks on or impressions of advertisements without the computer user's knowledge. Fraudulent clicks or impressions do not generate revenue or other value for an advertiser; however, the advertiser must pay for the clicks or impressions. Click or impression fraud therefore harms the advertiser by increasing advertising expense, and at the same time harms the publisher by lowering the perceived value of traffic the advertiser receives from the publisher.

In an effort to alleviate the problem of click or impression fraud, there have been attempts to create systems that detect click or impression fraud. Most click or impression fraud detection systems classify each click or impression in a binary manner as either "good" or "bad." Publishers may use the results of click or impression fraud detection systems in a number of ways. In some cases, a publisher may subtract bad clicks or impressions from the total number of clicks or impressions, charging an advertiser for only good clicks or impressions. Binary click or impression fraud detection systems, however, have several drawbacks. A click or impression may not fall neatly into either the good or bad category, or it may be impossible to determine from the data set that represents the click or impression whether in fact the click or impression is good or bad. A binary approach will therefore unfairly characterize those clicks or impressions that fall somewhere in between. In addition, advertisers may have differing thresholds as to the type of traffic they are willing to accept. One advertiser may consider a user simply viewing its web site as a valuable transaction; another advertiser may only consider a purchase to be a valuable transaction. A binary system does not allow an advertiser to set a level that determines the quality of traffic for which it is willing to pay the publisher. Advertisers and publishers alike would therefore benefit from having a more accurate system of click or impression fraud detection in order to better assess the value of traffic to publisher sites.

APPENDIX DETAILED DESCRIPTION FOR SCORING QUALITY OF TRAFFIC TO NETWORK SITES USING INTERRELATED TRAFFIC PARAMETERS

A software and/or hardware facility for scoring the quality of traffic to a site accessible via the Internet or other network is described. The facility extracts session data, or information identifying an agent's interactions with a server, from one or more server logs or other data sources that are obtained from a publisher, advertiser, or third party. In addition, the facility may obtain supplemental data from external data sources that assists in interpreting the agent's interactions with the server. A multi-factor analysis in the form of a rule set is applied by the facility to the session data. The analysis of the session data identifies agent actions that are desirable to a publisher, advertiser, or third party. Agent actions that are desirable to a publisher, advertiser, or third party include any activity that generates value for the publisher, advertiser, or third party, such as a click, a conversion (e.g., purchase), a submission of a form, bookmarking of the site, a rollover event, an impression, or other activity by the user. The facility generates a relative score for each agent action or for an aggregate number of agent actions based on whether the agent action is desired by the publisher, advertiser, or third party. The score may be used to assess the quality of the traffic received by a network site. Lower scores are indicative of fraudulent, likely fraudulent, or otherwise non-productive traffic having little value, whereas higher scores are indicative of traffic having desirable characteristics and therefore greater value.

In some embodiments, the score generated by the facility may be provided to the publisher or advertising network that published an advertisement. The publisher or advertising network may use the score for a number of purposes. For example, a publisher or advertising network may elect to use a pricing method that charges an advertiser a variable amount based on the score of the traffic an advertisement receives. The publisher or advertising network may decide not to charge for traffic that falls below a certain threshold. For example, certain sites desiring to market the high value of their traffic may elect to charge only for traffic having a score reflective of a low likelihood of fraud. In addition, a publisher or advertising network that receives a score on a real-time basis may decide not to display advertisements to agents that have a score indicating that the agent poses a high risk of fraud.

In some embodiments, the rule set used by the facility to generate the score may be manually determined. Rules used to determine the desirability of an agent action may include the physical location of the agent, the agent's browsing habits, search terms entered by the agent, rates charged to the advertiser for each agent action, the network topology from which the agent originated, and other characteristics. Rules may also be automatically determined by the facility based on the correlation between a trait of a given agent, advertiser, publisher, or other feature, and a measurement of the resulting fraudulent traffic associated with that trait. Different rule sets may be generated that are optimized for different environments Within each rule set, each rule may be weighted differently to generate an optimum combination of rules to comprise the rule set, and rules may be selectively removed if they do not perform well in an environment.

In some embodiments, the facility generates training set data for use in scoring the quality of traffic to network sites. The facility designs and executes one or more experimental advertising campaigns, each of which is likely to attract fraudulent or non-fraudulent agents. The facility receives one or more server or other data logs corresponding to the session traffic generated by the advertising campaigns. The facility standardizes the server logs and places the server log data in a uniform format. The facility selects sessions from the standardized server log data that fall outside of a normal range. Within these selected sessions, clusters of sessions are further identified, and each cluster is characterized as representing fraudulent, non-fraudulent, or unknown traffic. A false positive detection algorithm is applied to each cluster, eliminating those clusters falsely identified as indicating fraudulent or non-fraudulent traffic. The facility adds clusters identified as indicating fraudulent or non-fraudulent traffic to the training set. The training set data may be used as described herein to identify traffic parameters that are indicative of fraudulent traffic.

In some embodiments the facility scores the quality of traffic to a network site by evaluating various parameters associated with traffic to the site and determining combinations of traffic parameters that are indicative of the quality of traffic to the site. The facility receives server log data or other data sources representing session traffic associated with one or more network sites. The facility selects n rules that have been identified as statistically significant for the network site, each rule measuring one or more traffic parameters. The facility applies each rule to the data associated with a session and generates a result for each rule. The combination of all rule results for a particular session is referred to as a result vector. The facility uses an association table having a plurality of rows, where each row represents a unique combination of rule results (i.e., a unique result vector). The facility maps the generated result vector for each session to the corresponding row in the association table and records whether the transaction associated with the session is fraudulent or non-fraudulent. A fraud odds ratio, which represents how fraudulent sessions having a particular result vector are in comparison to sessions having different result vectors, is computed for each result vector. When sufficient session data has been processed, the facility parses the association table to identify those result vectors having the highest fraud odds ratio. The facility may optionally cross-validate the identified result vectors by applying the rules represented by a result vector to traffic that has not yet been processed by the facility. The facility may retain only those combinations of rules that produce consistent results, i.e., indicate similar proportions of fraudulent transactions. When new traffic is received by the facility, the facility may match the generated result vectors of the traffic to the corresponding row or rows in the association table and to the associated fraud odds ratio. Thus, the facility can estimate whether and to what degree the new traffic is likely to represent fraudulent or non-fraudulent transactions.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 4:
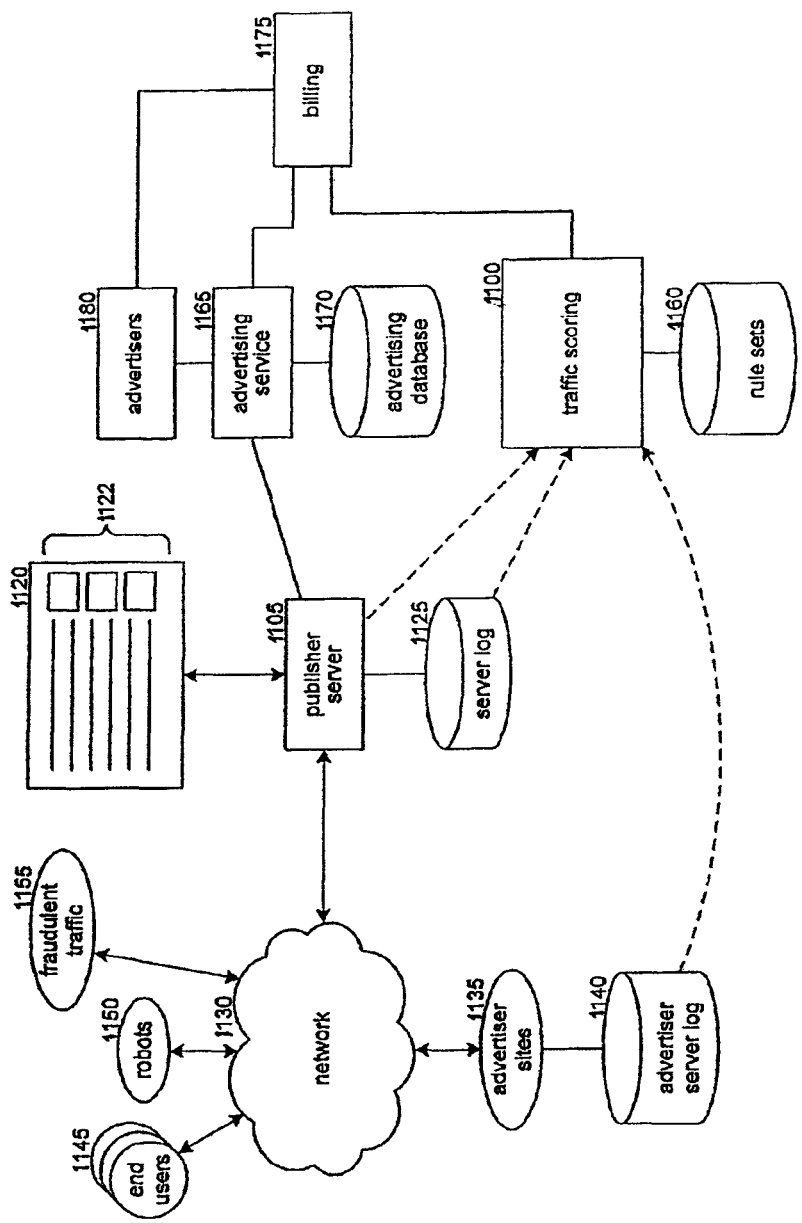
FIG. 4 is a block diagram of a representative facility for scoring the quality of network traffic and an environment in which the facility operates.

I. Appendix Overview for Scoring Quality of Traffic to Network Sites Using Interrelated Traffic Parameters FIG. 4 is a block diagram illustrating the components of a traffic scoring facility 1100 and a representative environment in which the traffic scoring facility operates. The traffic scoring facility 1100 extracts data from publishers, advertisers, agents, and/or other parties to generate a relative score of the quality of traffic received by a site accessible by a network (hereinafter "a publisher site"). The generated score relates to the value of the traffic to that site as characterized by one or more parties associated with the site. For example, the publisher site may be a site that displays online advertisements, and the desired agent on that site may be a human user that would benefit from viewing advertisements, rather than robotic traffic or human users with fraudulent intent. The score generated by the facility would thereby relate to the likelihood that the agent was a human user with non-fraudulent intent.

The publisher site includes a publisher server 1105 and a server log 1125. The publisher server 1105 serves one or more pages 1120 containing content to an agent that interacts with the site. An agent is any human, software entity, or device that interacts with the site, including, but not limited to, a human user, a human user with fraudulent intent, a robot, spyware, an adware or clickware virus, or improperly operating software. The server log 1125 stores session data associated with the agent's interactions with the publisher server 1105. The publisher site 1105 may be any type of site accessible via a network such as a search engine site, a directory site, a news or other content site, a social networking site, a photo sharing or other service site, or any other online property.

A publisher site will typically include or utilize the services of an advertising service 1165 to populate the publisher page 1120 that it produces with one or more advertisements. An advertiser 1180 may purchase advertising placements on a publisher site in a variety of ways. For example, the advertiser may purchase keywords from the advertising service 1165 that are relevant to the products and/or services that the advertiser offers. In the depicted environment, the advertising service 1165 generates a list 1122 of advertisements. The list may be generated by matching the keywords of a search query or a content page to advertiser-keyword pairings in its advertising database 1170. The list 1122 of advertisements generated by the advertising service 1165 may be displayed on the publisher page 1120, often above or alongside content provided by the publisher site.

When an agent takes an action associated with an advertisement displayed on a publisher page 1120, the agent is directed to an advertiser site 1135. Once at the advertiser site, the agent may interact with the site, such as by viewing content, purchasing products or services, and other activities. As the agent interacts with the advertiser site, data identifying an agent's actions is stored in a server log 1140. As will be described herein, the data in the server log may be utilized to characterize the value of the agent's interaction with the advertiser site.

When an agent is displayed an advertisement, a record of the agent action is maintained by the advertising service 1165 and the advertiser may be charged for the agent action. For example, if the advertising service relies on a cost-per-click model, the advertiser will be charged for an agent click on an advertisement. If the advertising service relies on an impression model, the advertiser will be charged for each time an advertisement is displayed to an agent. On a periodic basis, a billing component 1175 may deduct an amount from an advertiser's account equal to the number of agent actions multiplied by the value the advertiser has agreed to pay for each agent action. Those skilled in the art will appreciate that various limits may be set by the advertiser on the amount of its advertising spending, such as setting a maximum amount to be paid for each agent action or an aggregate amount to be paid within a certain time period.

In the majority of cases, traffic to the publisher server 1105 over a network 1130 (such as the Internet) is of value to the publisher and to advertisers that advertise on the publisher site. For example, human users 1145 may interact with the publisher server 1105 and take action associated with advertisements in which they have an interest, leading to the possibility of monetary or other gain for advertisers. Unfortunately, a portion of the traffic to the publisher server 1105 may come from sources that are not valuable to the publisher or advertisers. For example, robots 1150 may arrive at a publisher site and click on advertisements in search of email addresses or other data. Such robotic traffic increases the load on the publisher site, while at the same time fails to generate valuable traffic for advertisers. Other traffic 1155 with fraudulent intentions can also reach the publisher site. For example, individuals may click on or cause the display of advertisements of competitors, those with personal or political agendas contrary to their own, and others, all of which may intend to exhaust the advertising budget of the advertiser. Fraudulent traffic 1155 does not generate valuable traffic for an advertiser and may also be of little value to the publisher.

In order to reduce the effect of fraudulent traffic on advertisers and publishers, a traffic scoring facility 1100 may be operated by, or provided as a service to, publishers or advertisers. Data from server logs or other sources may be submitted to the traffic scoring facility 1100. Data may also be submitted directly from the publisher server 1105 to the traffic scoring facility 1100 in real time. As will be described in additional detail herein, the traffic scoring facility applies one or more rule sets stored in data store 1160 to the received data to generate a score that, on a per agent action or on an aggregate agent action basis, characterizes the traffic. The score reflects the anticipated value of the traffic, i.e., "good" traffic that is likely to be of value will receive a higher score and "bad" traffic that is likely to be of little value will receive a lower score.

Once a score has been computed for an individual agent action or for a group of agent actions, the traffic scoring facility 1100 may provide the score to the billing component 1175 of the advertising service. The advertising service may utilize the score in a variety of ways. For example, the advertising service may elect to use a pricing method that charges an advertiser 1180 a variable amount based on the score of the traffic its advertisement receives. Traffic having a higher score may be charged to the advertiser at a higher rate, while traffic having a lower score may be charged to the advertiser at a lower rate. Alternatively, a publisher may agree not to charge an advertiser for traffic that does not exceed a certain score. In this manner, an advertiser has greater control over the quality of traffic to which it advertises. In addition, an advertiser may determine whether to continue using an advertising service 1165 or a particular publisher based on the quality of traffic it receives. Based on the score of the traffic it receives, an advertiser may also decide to make adjustments to the keywords it purchases from the advertising service 1165 or to its methodology for placing advertisements. In addition, an advertiser or publisher may use the score to assess the damage or loss of revenue resulting from low quality traffic.

As discussed above, the traffic scoring facility 1100 utilizes one or more rule sets stored in data store 1160 to rate the quality of traffic an advertisement receives. In a training phase, the facility analyzes traffic in one or more environments and selects an optimum set of rules (an "environment rule set") that may be used to score traffic within each environment. In a scoring phase, an environment rule set is applied to traffic from an environment to score traffic in that environment. Each of these phases will be discussed in detail below.

Figure 5:
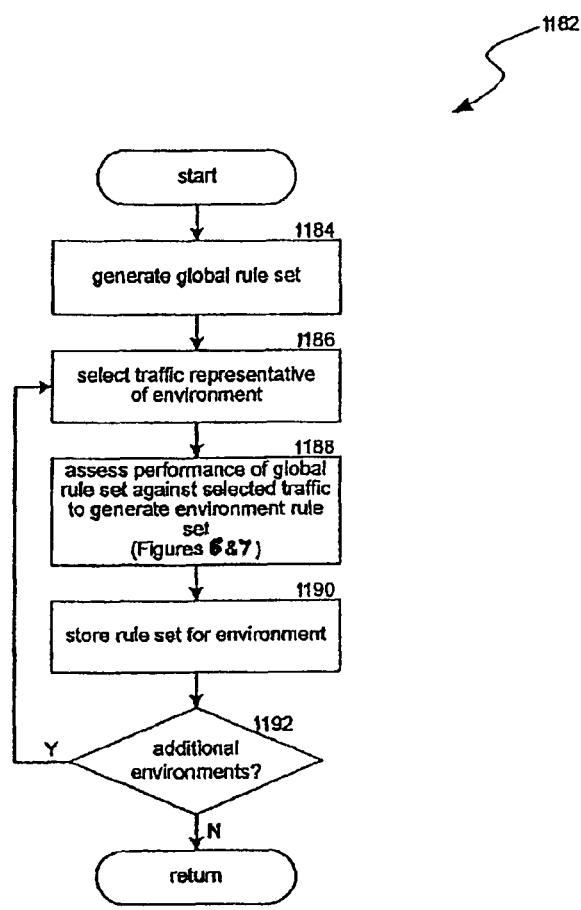
FIG. 5 is a flow diagram of a method of computing the quality of network traffic.

II. Appendix Training Phase for Scoring Quality of Traffic to Network Sites Using Interrelated Traffic Parameters FIG. 5 is a flow chart of a process 1182 for generating and validating rule sets that may be used to assess the value of traffic in various environments. At a block 1184, a global rule set is generated. Each rule in the global rule set is an expression that receives as input one or more parameters associated with an agent's session. When the rule is applied by the facility to the input parameters, it produces a result that reflects the value of an agent's actions associated with that agent's session. Rules may measure agent activities, including the speed with which an agent clicks on an advertisement (i.e., velocity), the time an agent spends on an advertiser's site, or the length or number of keywords an agent enters as search terms. Rules may also measure other characteristics of the agent. For example, one rule may score IP addresses and maintain a "blacklist" of IP addresses that generate low quality traffic. The blacklist may contain IP addresses, scores generated by traffic originating from those IP addresses, and other details. The facility may evaluate an IP address associated with a new agent by referencing the blacklist. Agents having IP addresses on the blacklist may be scored appropriately, and agents having an IP address in close proximity to IP addresses on the blacklist may be scored based on a function of the numerical distance between the agent's IP address and blacklisted IP addresses. Rules may also measure publisher and advertiser characteristics, including where a publisher resides within an advertising network hierarchy or the amount of money an advertiser is charged for each agent action associated with an advertisement. A sophisticated rule related to a publisher distribution partner may measure whether more than a certain percentage (e.g., >80%) of the IP addresses associated with the publisher have multiple user agents associated with those IP addresses as measured on the day that a click from that distribution partner was received. Such a characteristic is often indicative of traffic with little or no value to an advertiser.

Each rule in the rule set may be phrased in a manner that allows the rule to be applied and the result to be expressed in binary form (i.e., "1" if the rule is satisfied or "0" if the rule is not satisfied). For example, a rule may be defined as a physical location of an agent, with a result of "1" if the physical location of the agent is in the United States and a result of "0" if the physical location of the agent is not in the United States. Alternatively, the rule may be phrased in a manner such that the result may be expressed as having a value that varies from 0 to N (e.g., when N equals four, the result may take a value of 0, 1, 2, 3, or 4).

The global rule set may be generated in a variety of ways. For example, the global rule set may be manually selected by an operator of the traffic scoring facility based on observed patterns of fraudulent traffic. The facility may also automatically generate rules as it identifies environment features that correlate with fraudulent traffic. The total number of rules in the global rule set may range from the tens to the hundreds or more. The global rule set is not static; rather, it can be supplemented and modified over time. Ineffective rules may be removed from the global rule set, just as new rules may be added as they are generated or found beneficial.

Once a global rule set has been generated, at a block 1186 the facility selects a traffic data set representative of traffic in a particular environment. An environment may be any site, resource, or service having traffic that shares similar characteristics. For example, an environment may be a search web site that displays advertisements in conjunction with search results, an ecommerce web site that sells the products of an advertiser, or a content provider that offers a variety of services for others. The traffic data set may be represented in the form of a server log, log file, or other data format that allows various parameters associated with the traffic to be evaluated. In the event that actual traffic is not available, a training set of data that is believed to be reflective of the actual data may be used. Alternatively, a default training set of data may be used if no other agent action data is available.

Figure 6:
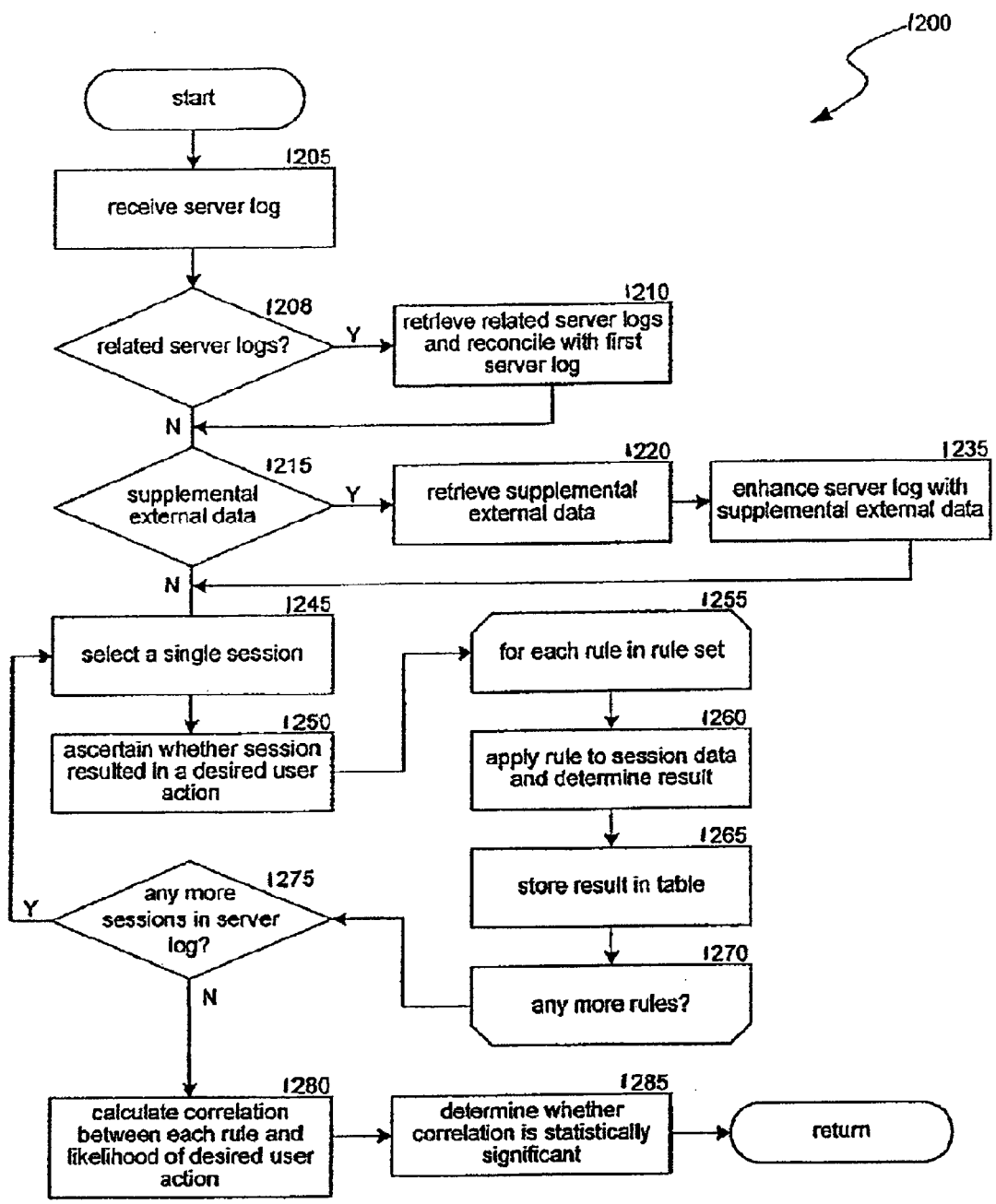
FIG. 6 is a flow diagram of a method of computing a correlation between a rule set that is used to assess the quality of traffic and a desired agent action.

At a block 1188 the facility analyzes the global rule set to assess the ability of each rule in the global rule set to predict the likelihood of valuable traffic in the selected environment. That is, a determination is made as to the likelihood that a desired agent action will occur for each result permutation when a rule is applied to traffic associated with the environment. FIG. 6 is a flow chart of a process 1200 that is implemented by the traffic scoring facility 1100 to determine the correlation between each rule in the global rule set and a desired agent action. As part of the analysis, the facility may rely on one or more server logs or other data sources created and maintained by an advertiser or publisher, as well as one or more sources of external data provided by third parties that may be used to further characterize or enhance the content in the server log. At a block 1205, the traffic scoring facility 1100 receives a server log, which may be an advertiser server log 1140 or a publisher server log 1135. At a decision block 1208, the facility determines whether there are other related server logs that may be used in the analysis. If other server logs exist, at a block 1210 the related server log or logs are retrieved and reconciled with the first server log. At a decision block 1215, the traffic scoring facility determines whether there is supplemental external data that may assist in interpreting a server log. Supplemental external data may include information from an advertiser about whether a conversion (e.g., purchase) or other desired agent action occurred, information from a publisher such as statistical information on advertisement performance, information relating to a geographical mapping of an IP address, and other types of information. If there is supplemental external data, the processing proceeds to a block 1220 where the external data is retrieved.

Once the server log and any supplemental external data are retrieved, the facility proceeds to a block 1235 where the server log is enhanced with the supplemental external data. For example, a server log retrieved from a publisher may not contain information about whether a conversion occurred, because a conversion occurs after an agent is transferred from the publisher site to an advertiser site. This data may only be available from an advertiser. In order to utilize the server log data to determine whether a correlation exists between a session and a conversion, data from the server log may be enhanced by data retrieved from the advertiser about whether a conversion occurred. As another example, in cases where the IP address associated with a particular agent is known, the IP address may be correlated with a geographical database to determine the rough geographical area from which the agent is accessing the site. Many types of supplemental external data can be used to enhance the data received from a server log.

At a block 1245, the facility chooses a single session from the server log data, as enhanced by the supplemental external data. A session may be defined as one or more entries in the server log or other data source indicative of an agent's interaction with a network site. A session may contain no clicks, one click, or multiple clicks that occur as an agent interacts with the network site, and a session may span one or more visits to the network site within a period of time (e.g., within an hour, within 24 hours). Those skilled in the art will appreciate that it can be difficult to identify a single agent session for many reasons, including that agents often share an IP address or a session identifier, a unique agent may have an IP address that changes, and other reasons. To identify a single agent session, the facility may therefore apply one or more algorithms. Under a simple agent ID algorithm, an agent may be identified by the first three bytes of its IP address in combination with the User Agent ID identified by the server log. Under an advanced agent ID algorithm, an agent may be identified by a combination of the User Agent ID identified by the server log, the last two parts of the domain name associated with the IP address (or the first two bytes of the IP address if no domain name can be found), and, if there are two or more agent actions, the elapsed time between the agent actions. By parsing a server log to identify all entries in the sever log that satisfy the algorithm, the facility is able to generate a subset of actions within the server log that may be associated with the particular agent.

Once a single session of an agent is selected, at a block 1250 the facility ascertains whether the session resulted in a desired agent action. A desired agent action is an action taken by an agent that generates value for the advertiser, such as monetary or other gain. Desired agent actions may be defined by the party generating the traffic score or by the party that will be receiving the traffic score. For example, if the desired action to be taken by a agent is the purchase of a product or service, a desired agent action may be defined as paying for the product or service. As another example, if the desired action to be taken by an agent is the viewing of a particular media clip, a desired agent action may be defined as the downloading of media content to an agent during a session. As still another example, a desired agent action may be a click on an advertisement that is displayed to the agent. A desired agent action may be globally recognized as beneficial by a large group of parties (e.g., the purchase of a product from a retailer or a human user), or more narrowly recognized as beneficial to a single party (e.g., the viewing of a trailer for a new movie at the site of the movie studio that is producing the movie).

For each rule in the global rule set, at a block 1260 the facility applies the rule to the data associated with a single session and determines the result, e.g., "0" or "1" in the binary example described above. At a block 1265, the facility stores the results in a table. FIG. 7 is a block diagram of a representative table 1300 in which the results may be stored. Each row 1310*a*, 1310*b*, . . . 1310*n* in the table corresponds to one rule in the global rule set (i.e., from rule$_1$ to rule$_n$). The first four columns in the table are used to record the result as each rule is applied to the session data. Columns 1315*a* and 1315*b* correspond to sessions that resulted in desired agent actions. Column 1315*a* reflects desired agent actions that occur when the result of the rule is "0" (i.e., the rule was not satisfied). Column 1315*b* reflects desired agent actions that occur when the result of the rule is "1" (i.e., the rule was satisfied). A count is maintained in each column, and is incremented to reflect a result that falls within that column. Columns 1320*a* and 1320*b* correspond to sessions that did not result in desired agent actions. Column 1320*a* reflects sessions where a desired agent action does not occur and the result of the rule is "0" (i.e., the rule was not satisfied). Column 1320*b* reflects sessions where a desired agent action does not occur and the result of the rule is "1" (i.e., the rule was satisfied). Each time a session is analyzed, the count within a column is incremented to reflect the result. For example, FIG. 7 shows the results of rule$_1$ for 10,000 agent sessions stored in row 1310*a*. While only four columns are depicted in table 1300 to reflect the results of applying a rule, those skilled in the art will appreciate that the number of columns may be any number that reflects the number of potential results for a rule. For example, a rule with three results ("0," "1," or "2") may require six columns—three devoted to the sessions that result in desired agent actions, and three devoted to sessions that do not result in desired agent actions. While FIG. 7 depicts a table whose contents and organization are designed to make it more comprehensible to the reader, those skilled in the art will appreciate that the actual data structure used by the facility to store this information may differ from the table shown. For example, the table may be organized in a different manner, may contain more or less information than shown, may be compressed and/or encrypted, and may otherwise be optimized in a variety of ways.

Returning to FIG. 6, at a block 1270 a test is made by the facility to determine if there are any more rules in the global rule set to apply. If additional rules exist, processing loops to block 1255 to process the next rule in the list. If additional rules do not exist, processing continues to a decision block 1275.

At a decision block 1275, the facility determines if additional sessions remain in the server log to be processed. If additional sessions exist that are to be processed, the facility returns to block 1245 to select the next session in the log. The process defined by blocks 1245 through 1270 is thereby repeated as many times as necessary to process the session information of all agent sessions as reflected in the server log or other data log. If no additional sessions remain to be processed at block 1275, processing continues to a block 1280.

In some embodiments, the rule set is applied only to those entries in a server log that correspond to a click or impression. An entry in a server log that corresponds to a click or impression may be referred to as an atomic session. In the embodiments described, each rule in the rule set is applied only to each atomic session. This application of the rule set is particularly advantageous in the case of scoring clicks on or impressions of advertisements.

Once all sessions have been processed, at a block 1280, the facility calculates a correlation coefficient that is representative of the likelihood that the session parameters tested by the rule will indicate a desired agent action. To calculate a correlation coefficient, an algorithm is applied to the session results stored in table 1300. In some embodiments, a statistically significant number of agent actions must have been measured that resulted in both sessions in which a rule was satisfied and sessions in which a rule was not satisfied in order for a correlation coefficient to be calculated. If there are fewer than a certain number of agent actions (e.g., 50) where the rule is satisfied or, alternatively, fewer than a certain number of agent actions where the rule is not satisfied, the correlation coefficient is set to zero. In other words, if the rule is nearly always satisfied or never satisfied, the rule may not be a good predictor of a desired agent action in the selected environment. In some embodiments, for a correlation coefficient to be calculated, a rule must result in a statistically significant number of both desired agent actions and non-desired agent actions. If either all agent actions are valuable, alternatively, no agent actions are valuable, the correlation is set to zero. In other words, if a desired agent action either always occurs or never occurs, the rule may not be a good predictor of a desired agent action in the selected environment. If a sufficient number of agent actions are measured from both a rule satisfaction and a desired agent action standpoint, then a correlation coefficient may be calculated for that rule. The correlation coefficient may be calculated for each rule in accordance with the following equation (1):

$$\text{coefficient}(\text{rule}_X) = \frac{\text{val\_and\_rule\_satisfied}(\text{rule}_x) - (\text{val}(\text{rule}_x) \cdot \text{rule\_satisfied}(\text{rule}_x))}{\sqrt{\text{val}(\text{rule}_x) \cdot \text{rule\_satisfied}(\text{rule}_x) \cdot \text{non\_val}(\text{rule}_x) \cdot \text{rule\_not\_satisfied}(\text{rule}_x)}}$$

where val_and_rule_satisfied is the percentage of the total number of agent actions in which a desired agent action occurs and the rule is satisfied (i.e., the percentage of agent actions that fall in column 1315b); val is the percentage of the total number of agent actions in which a desired agent action occurs (i.e., the percentage of agent actions that fall in either column 1315a or 1315b); rule_satisfied is the percentage of the total number of agent actions in which the rule is satisfied (i.e., the percentage of agent actions that fall in either column 1315b or 1320b); non_val is the percentage of the total number of agent actions in which a desired agent action does not occur (i.e., the percentage of agent actions that fall in either column 1320a or 1320b); and rule_not_satisfied is the percentage of the total number of agent actions in which the rule is satisfied (i.e., the percentage of agent actions that fall in either column 1315a or 1320a). This correlation equation may be applied in circumstances when the result of the rule is binary (i.e., "0" or "1") and the occurrence of a desired user action is binary (i.e., a user action either did or did not occur). In other cases, an appropriately modified or different correlation equation may be used. The result of the correlation coefficient calculation for each rule is stored in column 1340 of table 1300.

While a particular algorithm is disclosed for calculating the correlation coefficient, those skilled in the art will appreciate that a variety of different algorithms may be used to determine how well each rule may predict that the traffic characterized by the rule is beneficial (e.g., will result in a desired agent action) or harmful (e.g., is associated with fraudulent traffic). Correlation coefficients may be used rather than regression coefficients (computed through logistic regression) since correlation coefficients offer a more robust methodology. That is, the logistic regression approach is a poor choice when the dependent variables are highly correlated. The correlation approach described herein can be viewed as a ridge regression where regression coefficients are constrained and must have the same sign as the rule correlations.

After calculating the correlation coefficient, at a block 1285 the facility determines whether the correlation coefficient is statistically significant for the selected environment. The facility makes this determination by selecting only those rules that have a correlation coefficient that is in excess of a certain percentage. For example, the facility may keep only those rules that have a correlation coefficient in excess of 75% as part of a rule set that is associated with the environment (hereinafter, the "environment rule set"). If analysis of the correlation coefficient indicates that it is not statistically significant for the selected environment, the rule may be omitted from the environment rule set. The final column 1345 in the table 1300 contains a flag for each rule that may be set to a value of "0" or "1." Once the facility has determined at a block 1285 whether the correlation coefficient is statistically significant, the result is stored in column 1345. If a rule has a statistically significant correlation, the rule flag value in column 1345 will be set to "1." If the rule does not have a statistically significant correlation, the rule flag value in column 1345 will be set to "0." Only those rules with a rule flag value of "1," i.e., those that are statistically significant, will be used in determining a score of traffic in the selected environment. Rules that perform well for a particular environment are therefore maintained in the rule set for that environment, whereas rules that do not perform well for a particular environment are discarded.

Returning to FIG. 5, at a block 1190 the environment rule set for the particular environment, including the correlation coefficients for each of the rules in the environment rule set, is stored by the facility so that it may be used again without having to re-execute the process indicated by FIGS. 6 and 7. After the environment rule set has been stored, the facility proceeds to a block 1192 to determine whether there are any additional environments for which an environment rule set should be generated. If there are additional environments, processing loops to block 1186 to process the next environment. Once the training phase is complete, the facility will have generated and stored a rule set for each identified environment. In this way, a unique rule set may be generated for each publisher, advertiser, or other characteristic, or any combination thereof. Each rule set will reflect the predictive parameters of the traffic received by that environment.

Figure 8:
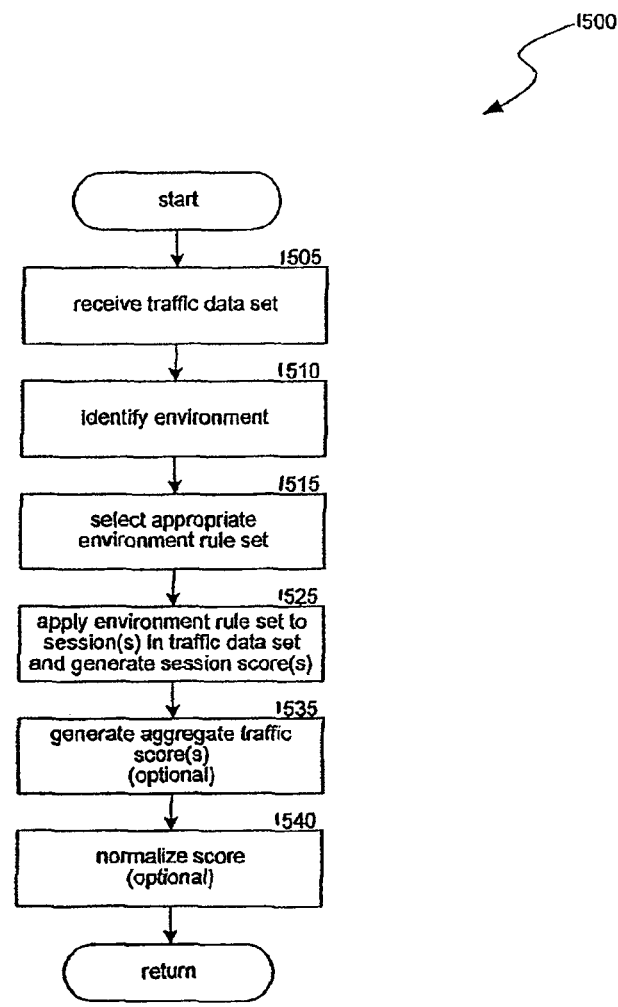
FIG. 8 is a flow diagram of a method of scoring an agent action based on a rule set.

III. Appendix Scoring Phase for Scoring Quality of Traffic to Network Sites Using Interrelated Traffic Parameters Once a rule set has been determined for an environment in the training phase, future traffic to that environment may be scored using the environment rule set during a scoring phase. FIG. 8 is a flow diagram illustrating a process 1500 of computing a score for a new agent action associated with an agent's interaction with a network site. At a block 1505, a traffic data set is received by the facility reflecting an agent's interaction with a particular environment. As discussed above, the traffic data set may take the form of a server log, log file, or other form of data that allows various parameters associated with the traffic to be evaluated. As in the training phase, the received traffic data set may be reconciled with any supplemental external data or any other traffic data sets that are related to the received traffic data set. At a block 1510, the facility identifies the environment with which the traffic data set is associated. The environment may be identified based on the publisher, advertiser, agent, and/or other feature of the environment. Once the environment has been identified, at a block 1515, the stored environment rule set for the identified environment is selected by the facility. If no environment rule set is available for the identified environment, or if the environment cannot be reliably identified by the facility, a default rule set may be used by the facility.

Once an environment rule set or default rule set has been selected, at a block 1525 the facility applies the environment rule set to each session within the traffic data set to generate a session score. To generate the score, the facility applies an algorithm that results in the summation of a function of the correlation coefficients over all rules in the environment rule set. The algorithm may be represented by the following equation (2):

$$\text{score} = \sum_{j=1}^{n} f(c_j) r_j$$

where there are n rules in the environment rule set, $f(c_j)$ is the correlation coefficient for each rule in the rule set, and $r_j$ is the result of the rule. The score calculated by equation (2) produces a score that is relative to the value of the session; higher scores indicate a more valuable agent action, whereas lower scores indicate a less valuable agent action. Calculating traffic scores in this fashion results in a more refined estimate of traffic value that is of greater benefit to publishers and advertisers.

In equation (2), each of the rules in the rule set is weighted equally. In some embodiments, it may be desirable to weight some rules more or less than others if the rules are deemed better or worse, respectively, than others at predicting whether a desired agent action will occur. In such a case, each rule may be weighted differently, e.g., by multiplying the rule by a coefficient prior to performing the summation. A weighted algorithm may be represented by the following equation (3):

$$\text{score} = \sum_{j=1}^{n} K_j f(c_j) r_j$$

where there are n rules in the environment rule set, $K_j$ is the weight applied to the rule, $f(c_j)$ is the correlation coefficient for each rule, and $r_j$ is the result of the rule. Each rule may be weighted by a value chosen from a small set of pre-selected values and may be optimized for a particular environment.

Once a session score has been generated for each session within the traffic data set, at a block 535 the facility may aggregate all session scores to generate a score for all or portions of the traffic data set. An aggregate score may therefore be calculated for all traffic received by a publisher or advertising network, or it may calculated for a more limited environment defined by a single advertiser, publisher affiliate, or other group. In this manner, the quality of traffic may be determined globally for a publisher or advertiser network, or it may be determined on a per publisher affiliate, advertiser, or other group basis.

Once a score has been calculated by the facility, either for a single session, a portion of the traffic data set, or a traffic data set as a whole, the score may optionally be normalized to place it into a form that may be more readily understood and used by advertisers and publishers. At a block 1540 the facility optionally normalizes the score so that the score will fall within a standard range. For example, the score may be normalized so that it always falls within a range from 300 to 800. When normalized in this fashion, each incremental change in the score may be more readily acted upon since the scale of the score has greater meaning. For example, a certain point change in a normalized score (e.g., a decrease of 50 points, as from 650 to 600) may correspond to a certain change in the proportion of agent actions that are valuable to an advertiser (e.g., the proportion of agent actions that are valuable to an advertiser is reduced by 50%). The score may also be converted into a non-numeric scale, such as an A+, A, B+, etc. scale, that may facilitate a greater understanding of and simplify the use of the score. By providing a gradated score for traffic, the facility significantly improves the ability of publishers and advertisers to use the score to assess the value of traffic.

Figure 9:
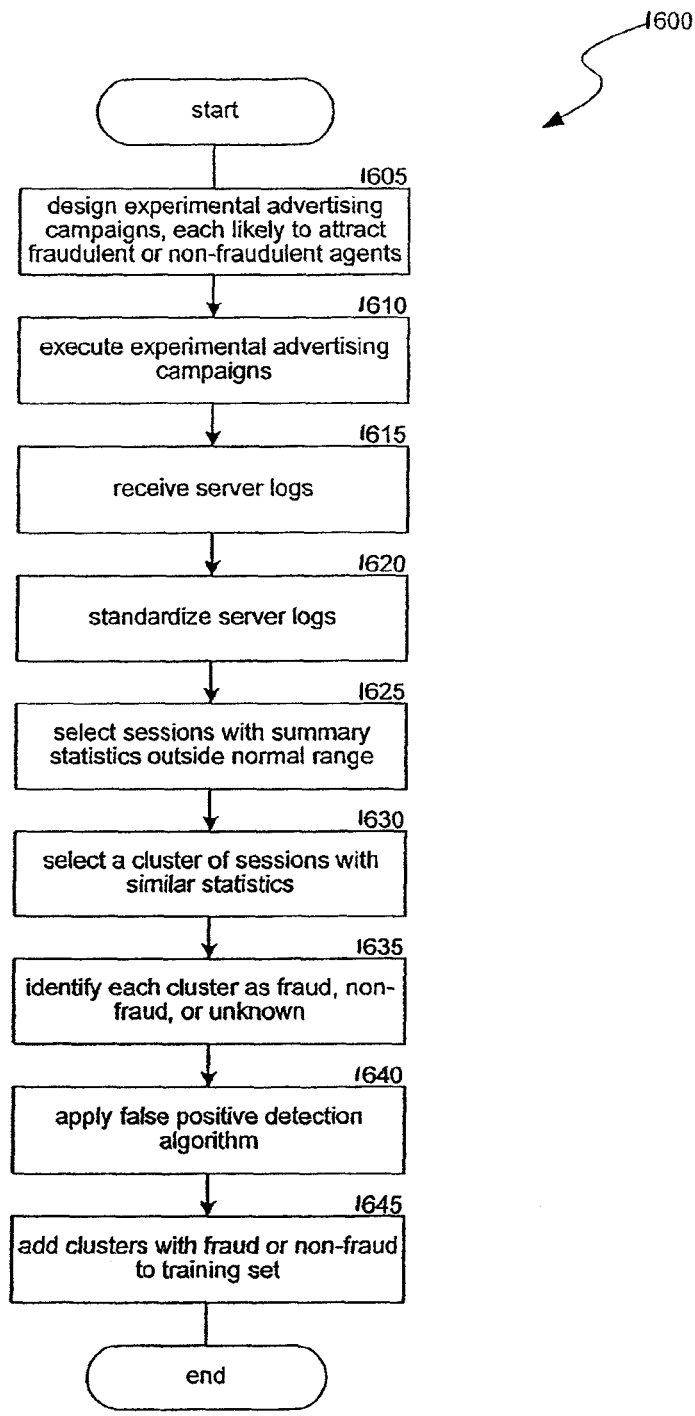
FIG. 9 is a flow diagram of a method of generating training set data.

IV. Appendix Training Set Creation for Scoring Quality of Traffic to Network Sites Using Interrelated Traffic Parameters FIG. 9 is a flow diagram of a process 1600 of generating training set data that may be used to help score the quality of traffic to network sites. At a block 1605 the facility designs experimental advertising campaigns, each of which is designed to attract either fraudulent or non-fraudulent agents. An experimental advertising campaign that is likely to attract fraudulent agents may involve purchasing advertising space on a third- or fourth-tier search engine or distribution partner site. These sites are often interested in increasing their revenue, even if it comes at the expense of the advertiser. They may engage in generating fraudulent agent actions associated with advertisements, such as through use of an automated robot agent. An experimental advertising campaign that is likely to attract non-fraudulent agents may be a campaign in which agent actions associated with advertisements do not lead to generation of revenue. Because no payment is made, the incentive for fraud is low. The experimental advertising campaigns may be developed by human or automated means.

Once the experimental advertising campaigns have been designed, at a block 1610 the campaigns are executed by the facility. Advertisements are posted on network sites according to the constraints of the advertising campaigns. When an agent takes an action associated with an advertisement displayed on a network site, the agent is directed to an advertiser site. Once at the advertiser site, the agent may interact with the site, such as by viewing content, purchasing products or services, and other activities. As the agent interacts with the advertiser site, session data, or data identifying an agents actions, is stored in a server log.

Once the advertising campaign has concluded, or at another interval determined by the facility, the facility receives server or other data logs at a block 1615. At a block 1620 the facility standardizes these server logs and places the data contained in the server logs into a uniform format. Summary statistics may be extracted from the standardized server logs. For example, data may be summarized based on different session characteristics, such as IP address, agent, distribution partner, or other session characteristic. At a block 1625 the facility selects sessions from the standardized server log data with summary statistics that fall outside the normal range. For example, the facility may select sessions that falls below a certain percentile (e.g., first percentile or fifth percentile), above a certain percentile (e.g., ninety-ninth percentile or ninety-fifth percentile), or both. The selected sessions represents the most or least fraudulent agent actions.

From the selected sessions identified at block 1625, at a block 1630 the facility selects clusters of sessions with similar statistics. Clusters may be determined by constructing one or more n-dimensional diagrams, where n is a desired number of rules. As described above, each rule is an expression that receives as input one or more parameters associated with an agent's session, such as IP address, time of day, and other parameters. When the rule is applied by the facility to the input parameters, it produces a result that reflects the value of an agent's actions associated with that agent's session. For example, if the facility is interested in clusters defined by two rules Rule 1 and Rule 2 the facility may construct a 2-dimensional diagram, where Rule 1 is mapped on the X-axis and Rule 2 is mapped on the Y-axis. The selected sessions are mapped on the 2-dimensional diagram, and those sessions whose mapped points are clustered together in the diagram will be selected. A clustering analysis may be performed for one or more permutations of rules. For instance, in the above example, additional 1-dimensional diagrams may be constructed to evaluate clusters defined by each of Rule 1 and Rule 2. If clusters defined by three rules are desired, a 3-dimensional diagram may be constructed to evaluate clusters defined by Rule 1, Rule 2, and Rule 3. Additional 2-dimensional diagrams may be constructed to evaluate clusters defined by Rule 2 and Rule 3 and by Rule 1 and Rule 3. Once clusters are selected, at a block 635 each cluster is characterized as representing fraudulent traffic, non-fraudulent traffic, or unknown. The classification of clusters may be made by a human or it may be automated. For those clusters in which it is unknown whether the cluster indicates fraudulent or non-fraudulent traffic, further analysis may be performed. This analysis may be performed by a human or it may be automated.

One or more algorithms may be used by the facility to detect clusters at a block 1630. Each algorithm may return, along with the detected cluster, a probability that the cluster indicates fraudulent or non-fraudulent traffic. For example, an algorithm may specify 90% certainty that an identified cluster represents fraudulent activity. The facility selects the cluster that is identified by the algorithm with the highest degree of certainty. For example, if algorithm 1 detects a first cluster and specifies 90% certainty that the cluster indicates fraudulent traffic and algorithm 2 detects a second cluster and specifies 80% certainty that the cluster indicates fraudulent traffic, the facility will select the first cluster because of the higher confidence that the first cluster indicates fraudulent traffic.

Once the clusters have been identified as fraud, non-fraud, or unknown, at a block 1640 the facility applies a false positive detection algorithm. A false positive detection algorithm may be applied by a human or it may be automated. In some embodiments, a false positive detection algorithm may be applied first by an automated program and then by a human to those clusters unresolved by the automated program. The goal of the false positive detection algorithm is to eliminate clusters improperly determined to indicate fraudulent or non-fraudulent traffic. To detect such false positive results, the algorithm may review session statistics, raw server log data, and other data sources, including data provided by third parties.

Those clusters that are approved by the false positive detection algorithm are added to the training set at a block 1645. The goal is to populate the training set with data that the facility has a high degree of confidence indicates fraudulent or non-fraudulent traffic. While the facility has been described to classify data in a binary form, e.g., fraudulent or non-fraudulent, one skilled in the art will appreciate that the facility may classify data in a non-binary form. For example, data may be classified in several categories, such as highly fraudulent, moderately fraudulent, moderately non-fraudulent, and highly non-fraudulent. Data could also be classified by a numerical score or according to one or more other classification schemes.

In order to reduce the effect of fraudulent traffic on advertisers and publishers, the training set data may be provided to the previously described traffic scoring system in order to train the system to better identify fraudulent traffic. The training set data enables the traffic scoring system to evaluate which traffic parameters are better indicators of fraudulent traffic.

Figure 10:
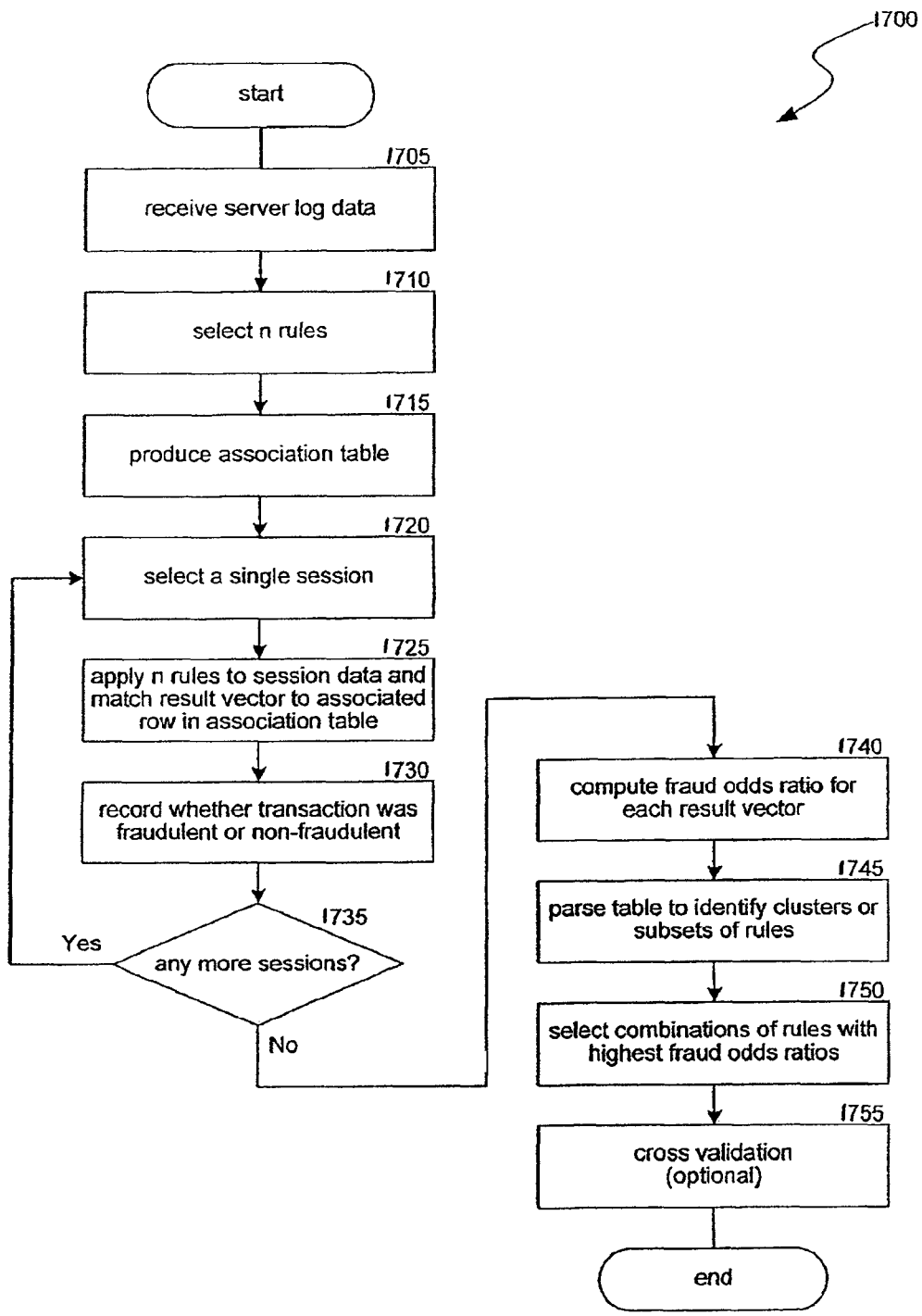
FIG. 10 is a flow diagram of a method of identifying correlated parameters that characterize traffic associated with network sites.

V. Appendix Interrelated Traffic Parameters for Scoring Quality of Traffic to Network Sites Using Interrelated Traffic Parameters FIG. 10 is a flow chart of a process 1700 for identifying combinations of parameters that characterize the quality of traffic associated with network sites. At a block 1705 the facility receives server log data or other data representing the traffic associated with one or more network sites. The facility may also receive data from other sources indicative of an agent's interaction with a network site. The server log data and any other data received may be provided to the facility in its original format, or it may be standardized so that the data obtained from various sources is presented in a uniform format. Further, summarized statistics may be extracted from the standardized data and provided to the facility. For example, data may be summarized based on different session characteristics, such as IP address, agent, distribution partner, or other session characteristic.

At a block 1710 the facility selects n rules that are to be evaluated in order to identify combinations of rules that are indicative of traffic quality. The n rules selected may be one or more of those rules identified as statistically significant, as described above, for the particular network site.

At a block 1715, the facility produces an association table 1800, as depicted in FIG. 11. The association table contains n+4 columns, where n is the number of rules being evaluated. Columns 1805*a*, 1805*b* . . . 1805*n* are each associated with one of the rules being evaluated. Column 1815 contains a count of the number of fraudulent transactions, column 1820 contains a count of the number of non-fraudulent transactions, column 1825 contains a count of the total number of transactions, and column 1830 contains a calculated fraud odds ratio. If the application of each rule produces a result having one of x values, the table will be comprised of $x^n$ rows 1810*a*, 1810*b* . . . 1810*m*, where x is the number of values each rule may take and n is the number of rules being evaluated. Each row in the table corresponds to a unique combination of rule results. For example, FIG. 11 depicts a table where x is 2, e.g., when applied each rule may have a result of either 0 or 1. The first row 1810*a* may contain values of [0, 0, . . . , 0, 0, 0], the next row 1810*b* may contain values of [0, 0, . . . , 0, 0, 1], and so on, with the last row 1810*m* containing values of [1, 1, . . . , 1, 1, 1]. All combinations of rule results are thereby represented in the table. While FIG. 11 depicts a table whose contents and organization are designed to make it more comprehensible to the reader, those skilled in the art will appreciate that the actual data structure used by the facility to store this information may differ from the table shown. For example, the table may be organized in a different manner, may contain more or less information than shown, may be compressed and/or encrypted, and may otherwise be optimized in a variety of ways.

Returning to FIG. 10, at a block 1720 the facility selects data representative of a single session, as defined above, from the server log data or other data. At a block 1725 the facility applies each of the n rules to the session data and generates a result for each rule. The combination of all rule results for a particular session is referred to as a result vector. The result vector is matched to the corresponding row in the association table. For example, if the result of each rule when applied to the session data is 0, the facility will match the session result vector to row 1810*a* of table 1800. At a block 1730 the facility records whether a transaction associated with the session was fraudulent or non-fraudulent. If the transaction was fraudulent or had indicia of being fraudulent, the facility increments the count in column 1815 of the appropriate row (e.g., row 1810*a* in the above example). If the transaction was non-fraudulent or had indicia of being non-fraudulent, the facility increments the count in column 1820 of the appropriate row. In either case, the facility also increments the count in column 1825 of the appropriate row to denote the transaction.

Figure 12:
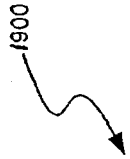
FIG. 12 is a block diagram of a data structure used to identify correlated parameters that characterize traffic associated with network sites, the data structure depicted after processing data characterizing the traffic.

At a decision block 1735 the facility determines if additional sessions remain in the server log or other data source to be processed. The facility may process all of the sessions in the server log or it may process fewer than all of the sessions in the server log. For example, the facility may reserve a certain percentage (e.g., 50%) of the sessions in order to validate, at a later time, the sessions that have been processed. If additional sessions exist that are to be processed, the facility returns to block 1720 to select the next session. The process defined by blocks 1720 to 1730 is thereby repeated as many times as necessary to process the session information of all agent sessions as reflected in the server log or other data source. If no additional sessions remain to be processed at block 1735, processing continues to a block 1740. FIG. 12 is an example of an association table 900 that may be generated by the facility after 15,200 sessions have been processed.

At a block 1740 a fraud odds ratio is computed for each row of the association table (i.e., for each result vector). The fraud odds ratio represents an estimate of how fraudulent sessions having a particular result vector are in comparison to sessions having different result vectors. The fraud odds ratio may be computed by equation (4):

$$\text{fraud\_odds\_ratio} = \frac{\left(\frac{\text{fraudulent\_result}}{\text{non\_fraudulent\_result}}\right)}{\left(\frac{\text{fraud\_total}}{\text{non\_fraud\_total}}\right)}$$

where fraudulent_result is the number of fraudulent transactions for a particular result vector; non_fraudulent_result is the number of non-fraudulent transactions for a particular result vector; fraud_total is the number of fraudulent transactions for all result vectors; and non_fraud_total is the number of non-fraudulent transactions for all result vectors. Fraud odds ratios computed according to equation (4) are provided in column 1930 of table 1900. While a particular algorithm is disclosed for calculating the fraud odds ratio, one skilled in the art will appreciate that a variety of different algorithms may be used to determine which result vectors are characterized by the greatest proportion of fraudulent transactions.

Those skilled in the art will appreciate that each row in the association table may be viewed as a final node in a decision tree, where each rule represented in the row corresponds to a node in the decision tree. The association table provides a method to generate the final decision tree nodes without having to generate the entire decision trees.

At a block 1745 the facility parses the association table in order to identify clusters or subsets of the n rules. A large number of subsets (e.g., 5,000) may be identified according to an optimization algorithm, such as simulated annealing or Markov chain Monte Carlo (MCMC) methods.

The facility may condense the association table initially created into an optimized association table. The facility may eliminate from the initial association table those result vectors that were generated by fewer than a certain number (e.g., 100) of transactions. In addition, the facility may remove those result vectors for which there is a high variance in fraud odds ratio, which indicates an inconsistent result. To filter out those result vectors with a high variance in fraud odds ratio, the facility may create several (e.g., three) occurrences of the initial association table for each cluster or subset of rules identified at block 1745. Each occurrence of the table may correspond to a different characteristic (e.g., date) of the sessions or to a different subset of a training set. The sessions that comprise each occurrence of the table may also be randomly selected. The facility may calculate the fraud odds ratio for each result vector in each occurrence of the table. Those rows that have result vectors in which there is a high variance in the fraud odds ratio between table occurrences may be eliminated. Thus, only those result vectors that are consistent, or robust, are maintained by the facility in the optimized association table.

The filtering step may also be viewed as removing unstable, or unreliable, final nodes from a decision tree. Those nodes that produce variable results depending on session characteristic or subset of rules, and are thus not reliable predictors of fraudulent or non-fraudulent agent actions, are removed by the facility. The facility retains only those nodes that produce consistent results.

At a block 1750 the facility selects those result vectors with the highest fraud odds ratio, further refining the optimized association table. These result vectors represent combinations of traffic parameters that are characterized by the greatest proportion of fraudulent transactions. The facility may choose to select a number (e.g., 200) of the result vectors having the highest fraud odds ratio in the association table. Alternatively or additionally, the facility may choose to all result vectors having a fraud odds ratio greater than a certain number (e.g., 25). The selected result vectors comprise the optimized association table; all other result vectors are discarded.

If fewer than all of the sessions in the server log or other data sources were processed by the facility at decision block 1735, at a block 1755 the facility may optionally perform cross-validation. To perform cross-validation, the facility may apply the combinations of rules selected at block 1745 to the sessions that were not previously processed by the facility. Those rules that produce results that are consistent with the results of the previously processed sessions (i.e., indicate similar proportions of fraudulent agent actions) may be retained by the facility, while those rules that produce results that are inconsistent with the results of the previously processed sessions (i.e., indicate varying proportions of fraudulent agent actions) may be discarded by the facility.

When new traffic is received by the facility, the facility may generate result vectors for the traffic and match the generated result vectors to the corresponding row or rows in the optimized association table. In this way, the facility can estimate whether and to what degree the traffic likely resulted in fraudulent or non-fraudulent agent actions. If there is no row in the optimized association table that matches the result of the new traffic, a correlation formula, such as equation (2) or (3), above, or a regression formula may be applied to the traffic in order to estimate whether and to what degree the traffic resulted in fraudulent or non-fraudulent agent actions. Simply matching the result vector of the new traffic to the row in the optimized association table that most closely matches, but does not exactly match, the result vector does may not produce a reliable estimate of whether and to what degree the traffic resulted in fraudulent agent actions. In order to have a more robust, accurate traffic scoring facility, the estimate of whether and to what degree new traffic resulted in fraudulent or non-fraudulent agent actions should be consistent whether the traffic is mapped to the optimized association table or, alternatively, a correlation or regression formula is applied to the traffic.

A session, a group of sessions, or a traffic data set as a whole may be scored according to an equation that is a function of the fraud odds ratio. For example, the score for a traffic data set may be the average score of all sessions identified within the traffic data set. The score that is calculated is relative to the value of the traffic; higher scores indicate that the traffic resulted in more valuable (or less fraudulent) agent action(s), whereas lower scores indicate that the traffic resulted in less valuable (or more fraudulent) agent action(s). Calculating traffic scores in this manner results in a more refined estimate of traffic value that is of greater benefit to publishers and advertisers.

Once a score has been calculated by the facility for a session, a group of sessions, or a traffic data set as a whole, the score may optionally be normalized, as described above, to place it into a form that may be more readily understood and used by advertisers and publishers.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the methods and system provided herein can be applied to other systems, not necessarily the system described above. The elements and operation of the various embodiments described above can be combined to provide further embodiments.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. In a method of generating scores for a quality of traffic received by a network site, the scores representative of likelihood that the traffic is of value to the network site, a method of preserving the scores of the quality of traffic represented by at least two scoring time periods having an overlapping scoring time, the method of preserving scores comprising:

Determining, by hardware computer processing of traffic data extracted from a data log storage using a multiple rule set, an average score representative of odds of conversion and spread for a first scoring period A;

estimating, by hardware computer processing using a multiple rule set applied to agent actions during an overlapping period AB, an average score representative of odds of conversion and spread for the overlapping period AB using available scaled scores from period AB;

modifying the multiple rule set applied by hardware computer processing to the first scoring period A to generate a modified rule set to be applied by hardware computer processing to a second scoring period B;

applying by hardware computer processing the modified multiple rule set in the second scoring period B to generate raw scores for the second scoring period B; and scaling, by hardware computer processing, raw scores for the second scoring period to maintain the average score of agent actions representative of odds of conversion and spread of the overlapping scoring period AB.

2. In a system for generating scores for a quality of traffic received by a network site, the scores representative of likelihood that the traffic is of value to the network site, a system for preserving the scores of the quality of traffic represented by at least two scoring time periods having an overlapping scoring time period, the system of preserving scores comprising:

a score determining component for determining by hardware computer processing of traffic data extracted from a data log storage using a multiple rule set, an average score representative of odds of conversion and spread for a first scoring period A;

an estimator in a computer for estimating, by hardware computer processing using a multiple rule set applied to agent actions during an overlapping period AB, an average score representative of odds of conversion and spread for the overlapping period AB using available scaled scores from period AB;

a rule modifier for modifying the multiple rule set applied to the first scoring period A to generate a modified multiple rule set to be applied to a second scoring period B;

a raw score generator for applying by hardware computer processing the modified multiple rule set in the second scoring period B to generate raw scores for the second scoring period B; and a raw score scaling component for scaling by hardware computer processing raw scores for the second scoring period to maintain an average score representative of odds of conversion and spread of overlapping period AB.

* * * * *